United States Patent
Hebert

(10) Patent No.: US 9,292,603 B2
(45) Date of Patent: Mar. 22, 2016

(54) RECEIPT AND PROCESSING OF USER-SPECIFIED QUERIES

(75) Inventor: Matthieu Hebert, Melocheville (CA)

(73) Assignee: Nuance Communications, Inc., Burlington, MA (US)

( * ) Notice: Subject to any disclaimer, the term of this patent is extended or adjusted under 35 U.S.C. 154(b) by 88 days.

(21) Appl. No.: 13/249,887

(22) Filed: Sep. 30, 2011

(65) Prior Publication Data

US 2013/0086029 A1    Apr. 4, 2013

(51) Int. Cl.
*G06F 17/30* (2006.01)

(52) U.S. Cl.
CPC .... *G06F 17/30864* (2013.01); *G06F 17/30646* (2013.01)

(58) Field of Classification Search
CPC .............. G06F 17/30864; G06F 17/30648; G06F 17/3064; G06F 17/30873; G06F 17/30637; G06F 17/30672
USPC ........................................................ 707/706
See application file for complete search history.

(56) References Cited

U.S. PATENT DOCUMENTS

| | | | |
|---|---|---|---|
| 7,917,528 B1 | 3/2011 | Dave et al. | |
| 8,073,867 B2 * | 12/2011 | Chowdhury | 707/771 |
| 8,239,366 B2 | 8/2012 | Sejnoha et al. | |
| 8,341,142 B2 | 12/2012 | Sejnoha et al. | |
| 8,548,799 B2 * | 10/2013 | Norton et al. | 707/706 |
| 8,635,201 B2 | 1/2014 | Regan et al. | |
| 8,666,963 B2 | 3/2014 | Sejnoha et al. | |
| 2003/0225825 A1 | 12/2003 | Healey et al. | |
| 2006/0129530 A1 | 6/2006 | Beavers et al. | |
| 2006/0136375 A1 | 6/2006 | Cox et al. | |
| 2007/0100625 A1 | 5/2007 | Silvera et al. | |
| 2007/0174244 A1 | 7/2007 | Jones | |
| 2007/0179847 A1 * | 8/2007 | Jain | 705/14 |
| 2007/0192315 A1 * | 8/2007 | Drzaic et al. | 707/5 |
| 2008/0016147 A1 | 1/2008 | Morimoto | |
| 2008/0021887 A1 | 1/2008 | Brinson, Jr. et al. | |
| 2008/0033982 A1 * | 2/2008 | Parikh et al. | 707/102 |
| 2008/0114743 A1 * | 5/2008 | Venkataraman et al. | 707/3 |
| 2008/0201304 A1 | 8/2008 | Sue | |

(Continued)

FOREIGN PATENT DOCUMENTS

| | | |
|---|---|---|
| EP | 1 033 701 A2 | 9/2000 |
| EP | 1 072 984 A2 | 1/2001 |
| EP | 1 148 412 A2 | 10/2001 |

OTHER PUBLICATIONS

Meng. W. et al., "Building Efficient and Effective Metasearch Engines," ACM Computing Surveys, Mar. 1, 2002, pp. 48-89, vol. 34, No. 1.

(Continued)

*Primary Examiner* — Rehana Perveen
*Assistant Examiner* — Tiffany Thuy Bui
(74) *Attorney, Agent, or Firm* — Wolf, Greenfield & Sacks, P.C.

(57) ABSTRACT

Some embodiments of the invention provide techniques for receiving a query from a user of a mobile device, and for conveying to the user not only search results, but also feedback relating to query. For example, the user may be prompted to elicit supplemental information relating to the query, or provided other feedback. The feedback may be conveyed in a manner which minimizes how much of the mobile device's display screen is dedicated to presenting the feedback.

39 Claims, 14 Drawing Sheets

(56) References Cited

U.S. PATENT DOCUMENTS

| | | | |
|---|---|---|---|
| 2008/0256058 A1* | 10/2008 | Kother | 707/5 |
| 2008/0319993 A1* | 12/2008 | Lunenfeld | 707/5 |
| 2009/0006358 A1* | 1/2009 | Morris et al. | 707/5 |
| 2009/0119234 A1 | 5/2009 | Pinckney et al. | |
| 2010/0312782 A1 | 12/2010 | Li et al. | |
| 2011/0055190 A1* | 3/2011 | Alexander | 707/706 |
| 2012/0016678 A1 | 1/2012 | Gruber et al. | |
| 2012/0059658 A1 | 3/2012 | Sejnoha et al. | |
| 2012/0059810 A1 | 3/2012 | Sejnoha et al. | |
| 2012/0059814 A1 | 3/2012 | Sejnoha et al. | |
| 2012/0060113 A1 | 3/2012 | Sejnoha et al. | |
| 2012/0072405 A1* | 3/2012 | Guay et al. | 707/706 |
| 2012/0259636 A1 | 10/2012 | Sejnoha et al. | |
| 2013/0018863 A1 | 1/2013 | Regan et al. | |
| 2013/0018864 A1 | 1/2013 | Regan et al. | |
| 2013/0018865 A1 | 1/2013 | Regan et al. | |
| 2013/0018867 A1 | 1/2013 | Regan et al. | |
| 2013/0019202 A1 | 1/2013 | Regan et al. | |
| 2013/0086025 A1 | 4/2013 | Hebert | |
| 2013/0086026 A1 | 4/2013 | Hebert | |
| 2013/0086027 A1 | 4/2013 | Hebert | |
| 2013/0086028 A1 | 4/2013 | Hebert | |
| 2013/0124495 A1 | 5/2013 | Sejnoha et al. | |
| 2013/0144857 A1 | 6/2013 | Sejnoha et al. | |

OTHER PUBLICATIONS

International Search Report and Written Opinion for nternational application No. PCT/US2011/050669 mailed Sep. 26, 2012.
International Search Report and Written Opinion for International application No. PCT/US2012/054780 mailed Jan. 23, 2013.
Wyard et al., Spoken Language Systems—Beyond Prompt and Response. BT Technology Journal. Jan. 1, 1996:14(1):187-205.
International Preliminary Report on Patentability for International application No. PCT/US2012/054780 mailed Apr. 10, 2014.

\* cited by examiner

RECEIPT AND PROCESSING OF USER-SPECIFIED QUERIES

FIELD

Embodiments of the invention relate generally to search queries, and more particularly to techniques for receiving and/or processing search queries on a computer system.

BACKGROUND

The Internet is a global system of interconnected computer networks that store a vast array of information. The World Wide Web (WWW) is an information sharing model built on top of the Internet, in which a system of interlinked hypertext documents are accessed using particular protocols (i.e., the Hypertext Transfer Protocol, or HTTP, and its variants).

Because of the enormous volume of information available via the WWW and the Internet, and because the available information is distributed across an enormous number of independently owned and operated networks and servers, locating desired content on the WWW and the Internet presents challenges.

Search engines have been developed to aid users in locating desired content on the Internet. In general, a search engine is a computer program that receives a search query from a user indicative of content desired by the user, and returns information and/or hyperlinks to information that the search engine determines to be relevant to the user's search query.

Search engines typically work by retrieving a large number of web pages and/or other content using a computer program called a webcrawler that browses the World Wide Web in automated fashion (e.g., following every hyperlink that it comes across in each web page that it browses). Retrieved web pages and/or content is analyzed and information about the web pages and/or content is stored in an index. When a user issues a search query to the search engine, the search engine uses the index to identify the web pages and/or content that it determines to best match the user's search query, and returns a list of results with the best-matching web pages and/or content. Frequently, this list is in the form of one or more web pages that include a set of hyperlinks to the web pages and/or content determined to best match the user's query.

There are at least two general types of search engines accessible via the Internet: general-purpose search engines and site-specific search engines. As used herein, the term "general-purpose search engine" is defined to mean a search engine that provides search results that include web pages and/or content (or hyperlinks to web pages and/or content) hosted on at least two different and independent web sites or domains. General purpose search engines attempt to index and provide search results from content distributed across a wide swath of the Internet. Examples of general purpose search engines include Google™, operated by Google, Inc. of Mountain View, Calif.; Yahoo!™, operated by Yahoo!, Inc. of Sunnyvale, Calif.; and Bing™, operated by Microsoft Corp. of Redmond, Wash.

As used herein, the term "site-specific search engine" is defined to mean a search engine that provides search results that include web pages and/or content (or hyperlinks to web pages and/or content) hosted on only one web site or domain. Site-specific search engines are frequently used by operators of web sites to allow users to find specific web pages or content on their web sites. For example, the web site of an online retailer (or "e-tailer") may include a site-specific search engine that facilitates a user locating web pages for products sold by the retailer.

SUMMARY

Some embodiments of the invention provide a method, performed by at least one computer, comprising acts of: (A) receiving a query submitted by a user of a mobile device; (B) causing a representation of the query to be submitted to a plurality of search engines comprising a first search engine associated with a first web site and a second search engine associated with a second web site; (C) receiving a supplemental input, submitted by the user to the first web site, the supplemental input relating to content of the query; and (D) causing a representation of the supplemental input received in the act (C) to be submitted to the second search engine.

Other embodiments of the invention provide a method, performed by a client device, comprising acts of: (A) receiving a query from a user; (B) causing to be displayed results, generated based on the query from a plurality of search engines, the plurality of search engines comprising a first search engine associated with a first web site and a second search engine associated with a second web site; (C) receiving supplemental input from the user submitted to the first web site, the supplemental input relating to content of the query; and (D) causing to be displayed results, generated based on the supplemental input, from the second search engine.

Still other embodiments of the invention provide at least one tangible non-transitory computer readable medium having instructions encoded thereon which, when executed, perform a method comprising acts of: (A) receiving a query submitted by a user of a mobile device; (B) causing a representation of the query to be submitted to a plurality of search engines comprising a first search engine associated with a first web site and a second search engine associated with a second web site; (C) receiving a supplemental input, submitted by the user to the first web site, the supplemental input relating to content of the query; and (D) causing a representation of the supplemental input received in the act (C) to be submitted to the second search engine.

Yet other embodiments of the invention provide at least one tangible non-transitory computer readable medium having instructions encoded thereon which, when executed by a client device, perform a method comprising acts of: (A) receiving a query from a user; (B) causing to be displayed results, generated based on the query from a plurality of search engines, the plurality of search engines comprising a first search engine associated with a first web site and a second search engine associated with a second web site; (C) receiving supplemental input from the user submitted to the first web site, the supplemental input relating to content of the query; and (D) causing to be displayed results, generated based on the supplemental input, from the second search engine.

Still other embodiments provide at least one computer, comprising: at least one processor programmed to: receive a query submitted by a user of a mobile device; cause a representation of the query to be submitted to a plurality of search engines comprising a first search engine associated with a first web site and a second search engine associated with a second web site; receive a supplemental input, submitted by the user to the first web site, the supplemental input relating to content of the query; and cause a representation of the supplemental input to be submitted to the second search engine.

Yet other embodiments provide at least one computer, comprising: at least one processor programmed to: receive a query from a user; cause to be displayed results, generated based on the query from a plurality of search engines, the plurality of search engines comprising a first search engine associated with a first web site and a second search engine associated with a second web site; receive supplemental input from the user submitted to the first web site, the supplemental input relating to content of the query; and cause to be displayed results, generated based on the supplemental input, from the second search engine.

DETAILED DESCRIPTION

I. Overview

Figure 1:
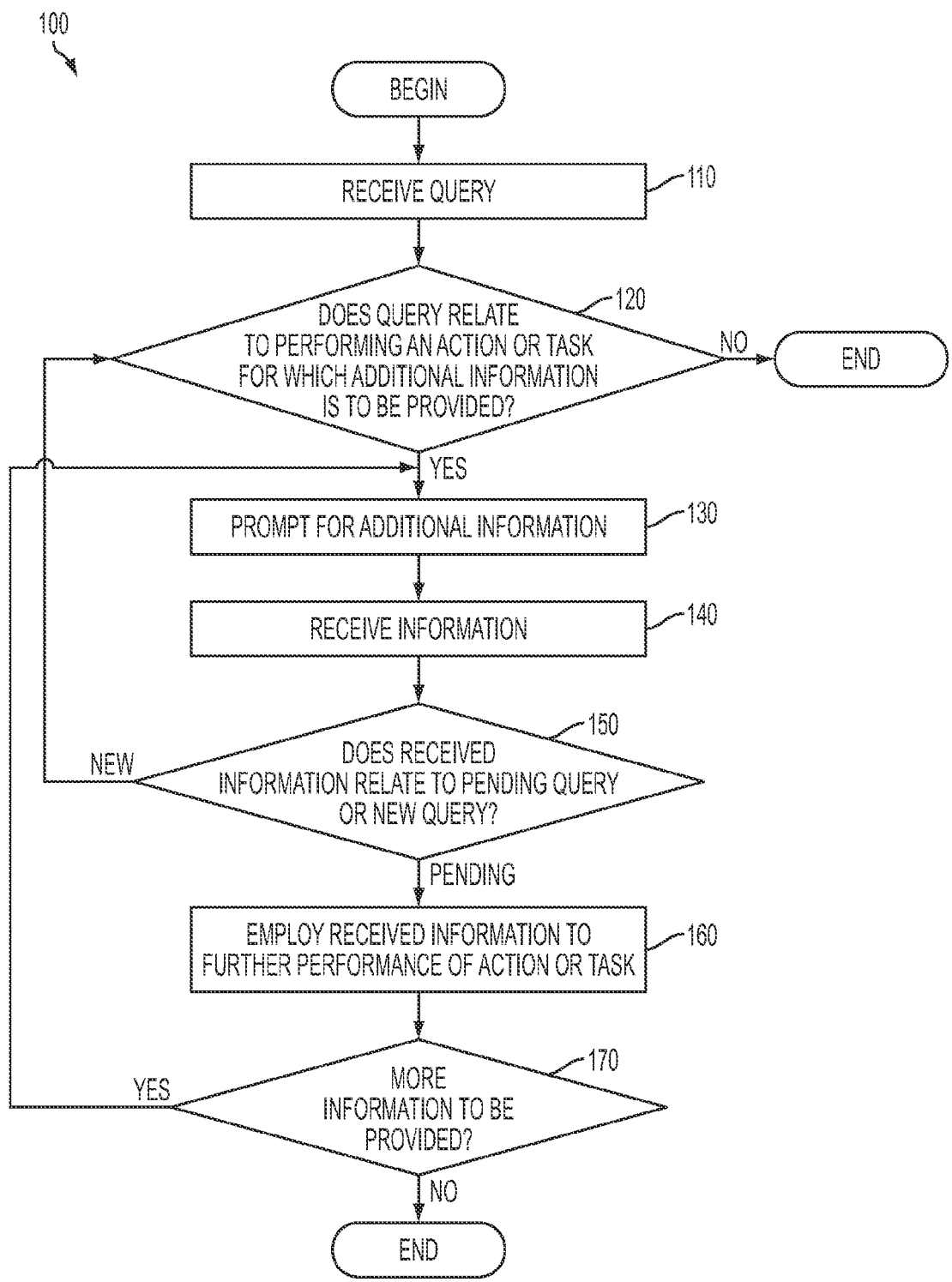
FIG. 1 is a flowchart depicting an example technique through which a dialogue may be conducted with a user that submits a search query, in accordance with some embodiments of the invention.

Commonly assigned co-pending U.S. patent application Ser. No. 12/877,765, entitled "Methods and Apparatus for Displaying Content" ("the '765 application"), which is incorporated herein by reference in its entirety, describes techniques related to issuing a user-specified search query to multiple search engines and/or displaying the results of such queries to users. Some techniques disclosed by this co-pending application allow a user to input a search query to an application program on a client device, and view search results for that search query provided by multiple different search engines. The search query inputted by the user may, for example, comprise voice and/or text input to the application program.

In some applications of the technology described in the '765 application, the client device on which search results are returned may be a mobile device (e.g., a personal digital assistant (PDA), mobile telephone (e.g., a smartphone), or other mobile device) with a relatively small display. The Applicant has appreciated that in a number of circumstances, it may be desirable to convey to the user not only search results, but also feedback relating to the search results (e.g., a prompt to elicit supplemental information relating to the query, a list of choices relating to content of the query, a confirmation, and/or other feedback) Given the relatively small display on some user devices, the Applicant has appreciated that it may be desirable to provide techniques for conveying feedback information and optionally receiving responsive input from the user (referenced herein generically as dialogue feedback) in a manner that minimizes how much of the display screen is dedicated to the dialogue feedback. Thus, some embodiments of the invention are directed to such techniques. While described in some examples as being for use with the system described in the '765 application, embodiments of the invention are not limited in this respect.

Some embodiments of the present invention provide techniques for receiving a query, submitted by a user of a mobile device, and identifying a task, provided by an application accessible via the mobile device (e.g., a web-based application or service accessible via the Internet and/or another communication medium, an application residing on the mobile device, a collection of components comprising a subset accessible via a communication medium and a subset residing locally, and/or any other application or service) to which the query relates. A determination is made whether the query provides sufficient information to enable the application to perform the task. If the query does not provide sufficient information to enable the application to perform the task, the user may be prompted to provide additional information relating to the task. A task may, for example, be any set of one or more actions performed to accomplish one or more objectives. Example tasks described herein include making a restaurant reservation, shopping for an item, and booking a taxi. However, it should be appreciated that these examples are merely illustrative, and that a task may include any one or more actions.

Some embodiments of the invention provide techniques whereby feedback relating to a dialogue to which a user's query relates is presented to the user. For example, the feedback may prompt the user for information to further performance of the task. In some embodiments, a dialogue may be conducted between the user and the device (e.g., between the user and the application program that desires the information, between the user and a process executing on the device to gather the information for that application, and/or one or more other components) to collect information identified as relating to performing the task.

In some embodiments, a dialogue is conducted with the user via a facility that does not substantially decrease the capability of the user device to display other information to the user (e.g., search results generated by one or more search engines, as described further below). For example, in some embodiments, a dialogue may be conducted with the user via an unobtrusive feedback facility that occupies a relatively small amount of screen interface "real estate," such as a relatively small banner, bubble, or other facility for presenting information to, and receiving input from, the user. For example, in some embodiments, a feedback facility may be shown on the top or bottom of the display, and may present feedback on a query, such as to prompt the user for further input (e.g., relating to performing a task). A feedback facility may, for example, prompt a user to select from among several options or choices for a given item of information determined to relate to a task that he/she appears to be performing. In some embodiments, a feedback facility may accept any of numerous types of input from the user, including voice input, touch input, typed input, and/or any other type of input. For example, in some embodiments, a feedback facility may be "clickable," enabling a user to select from among various options presented thereby. In some embodiments, presentation of a feedback facility may alter the manner in which other information is shown on the display. For example, presentation of a feedback facility may change the way in which search results are shown, such as by reducing the portion of the display in which search results are displayed.

In some embodiments, techniques are provided for automatically determining whether a user's input relates to a query that was previously submitted to a mobile device, or constitutes a new query. For example, if a user a user's query is received, he/she is prompted for information relating to performing a particular task, any input submitted by the user may be processed to determine whether the input relates to his/her originally submitted query, or constitutes a new one.

For embodiments wherein a user initially provides a search query that is presented to multiple search engines associated with multiple web sites, if the user provides information to one of the web sites, the query can be updated with the supplemental information and re-submitted to all of the search engines to provide updated results from all. In this manner, a user desiring to provide supplemental information relating to the query need not do so manually to each of the web sites.

In some embodiments, a user may control the manner in which a banner or ticker displays information. For example, if the amount of information to be displayed by a banner or ticker dictates that the information scroll across the display, the user may control the speed at which the information scrolls (e.g., by tilting the device, pressing a button or other control, "swiping" the banner or ticker, etc.). Any of numerous types of display controls may be provided.

FIG. 1 depicts an example process 100 for determining whether a user-specified query submitted to an application program relates to performing a task that involves the user supplying multiple items of information to the application program, determining whether all of those items of information are present in the query, and if not, collecting some or all of the items of information that are not present in the query.

In some embodiments, one or more of the acts comprising example process 100 may be performed by an application program executing on a client device employed by the user and/or a computer. The client device upon which the application program executes may be any suitable type of computing device having hardware capable of executing instructions. Examples of suitable types of client devices include a laptop or desktop, personal computer, a personal digital assistant (PDA), a mobile phone, a server computer, and/or various other types of computing devices. The client device may, for example, communicate with one or more external computers via a communication medium. Each external computer may also comprise any suitable type of computing device, such as a laptop or desktop personal computer, server computer, and/or other type of computing devices. Collectively and/or individually, the client device and external computer may provide speech recognition capability, so that a user-specified query may be submitted via voice input. However, embodiments of the invention are not limited to systems having speech recognition capability. In one particular implementation described herein, the techniques described below may be implemented on a mobile telephone (e.g., a smartphone) providing access to a speech recognition capability so that the user may issue search queries by voice. However, it should be appreciated that embodiments of the invention are not limited to employing mobile phones, or a speech recognition capability.

Figure 2:
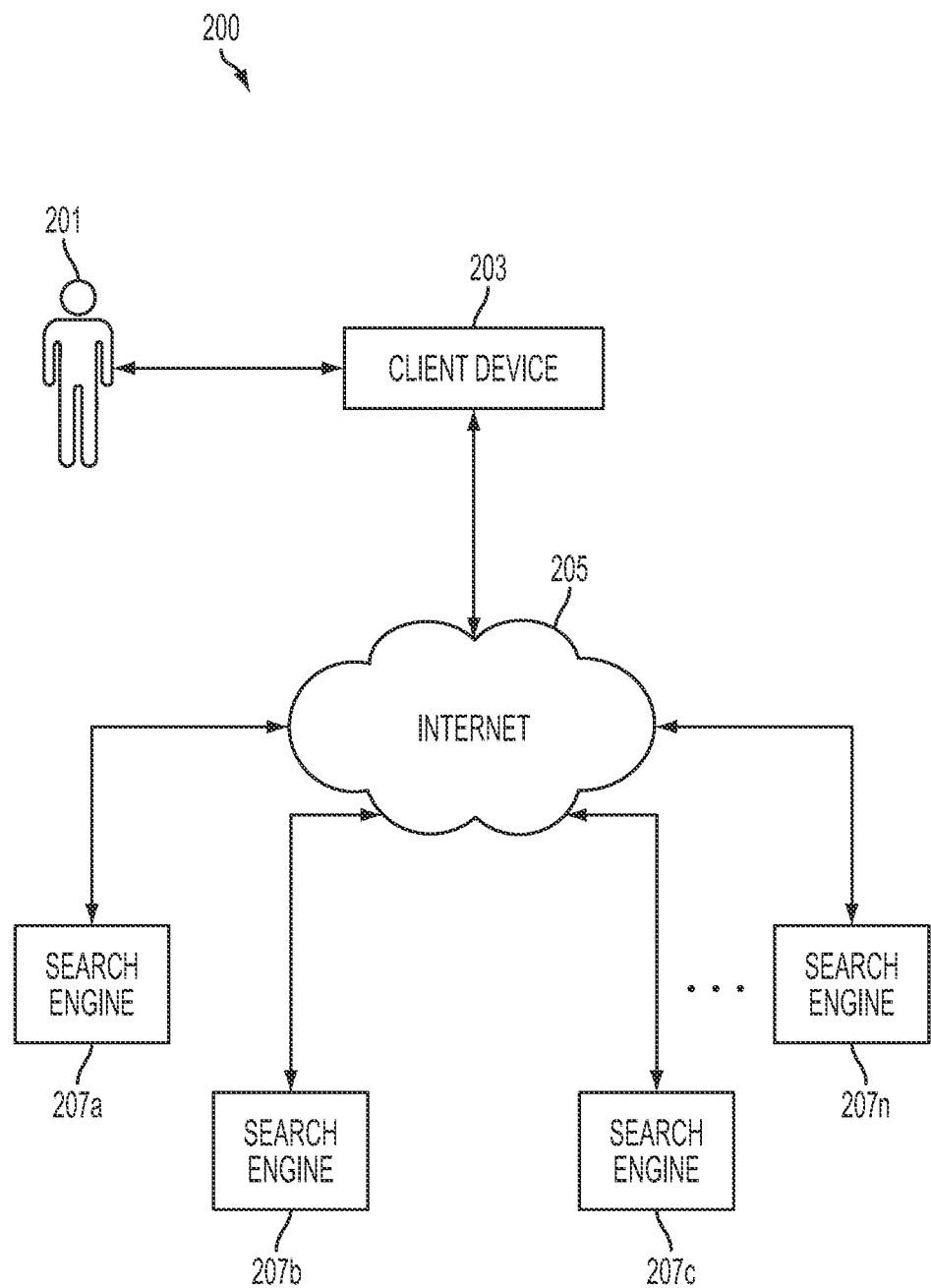
FIG. 2 is a block diagram of an example computer environment in which some embodiments of the invention may be implemented.
Figure 5:
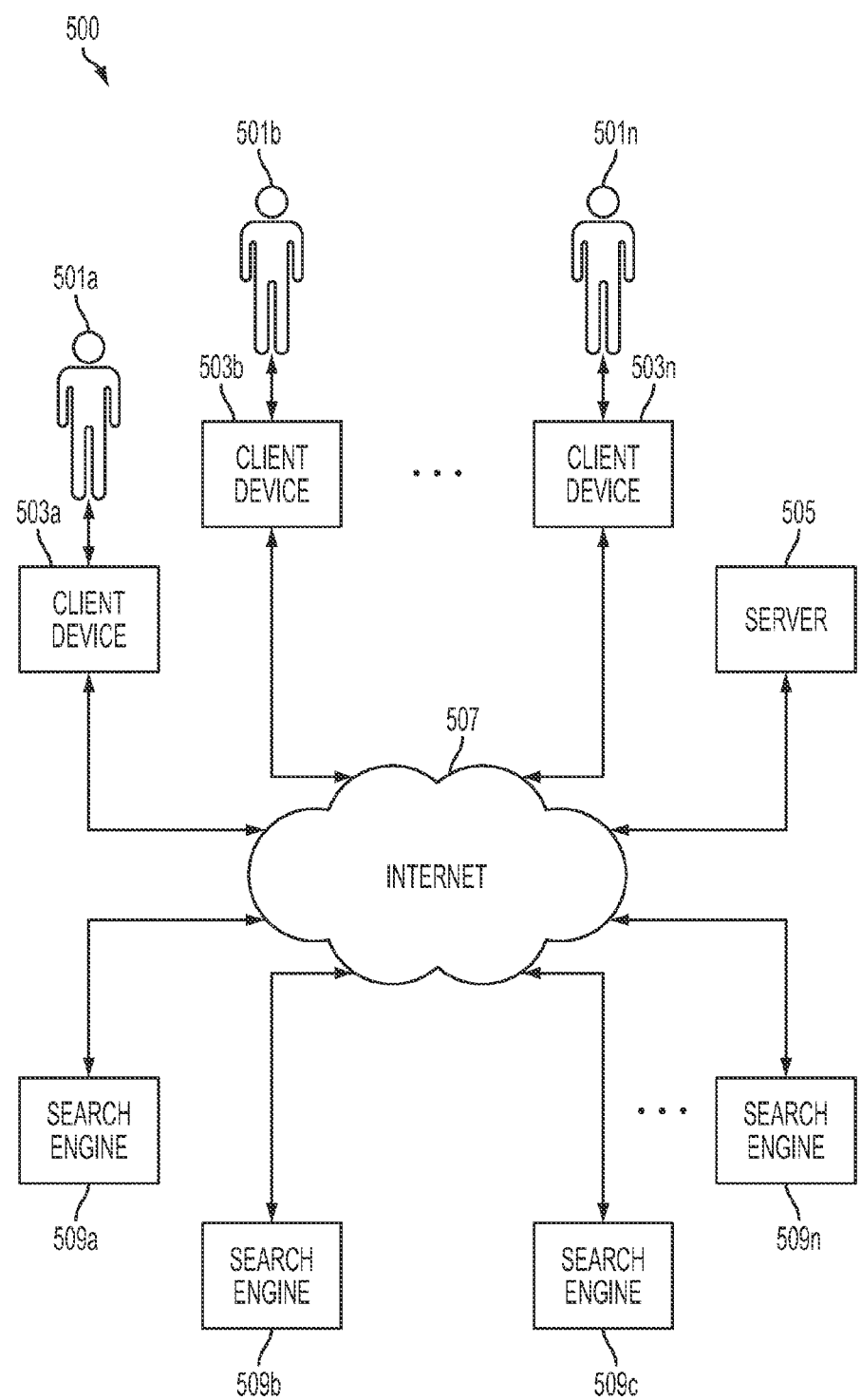
FIG. 5 is a block diagram of an example computing environment in which some embodiments of the invention may be implemented.

It should also be appreciated that embodiments of the invention may be implemented using any suitable system configuration, comprising any suitable component(s). For example, some embodiments of the invention may receive a user-specified query, generate one or more search queries, display results therefrom, and prompt a user for additional information, all on a single device. In other embodiments, example process 100 may be performed in a system 200 like that shown in FIG. 2. In these embodiments, a client device 203 may receive a user-specified query, generate one or more search queries, and distribute the search queries to search engines 207a, 207b, 207c . . . , and 207n, executing on servers accessible to client device 203 via Internet 205, and display results from one or more of search engines 207a, 207b, 207c . . . , and 207n to a user. In yet other embodiments, example process 100 may be performed in a system 500 like that which is shown in FIG. 5. In these embodiments, a client device 503 may receive a user-specified query, transmit the user-specified query to server 505 (e.g., via a communication medium, such as the Internet or some other medium) for generation of one or more search queries, receive the generated one or more search queries from server 505, and submit each search query to a search engine 609a, 609b, 609c, . . . and 609n. Embodiments of the invention are not limited to being performed by a system having any particular configuration or component(s).

At a high level, example process 100 comprises receiving input defining a query in act 110, and determining in act 120 whether the query provides sufficient information to enable an application to perform a task. If not, the user is prompted for additional information relating to the task in act 130, and information is received in act 140. A determination is made in act 150 whether the information received in act 140 relates to the originally submitted query (i.e., received in act 110), or a new query. If the received information relates to the originally submitted query, the information is used to further completion of the task in act 160. If it is determined in the act 150 that the received information relates to a new query, then example process 100 returns to act 120, and proceeds as described above. After the information is used to further completion of the task in act 160, example process 100 proceeds to act 170, wherein a determination is made whether more information is to be provided by the user. If so, example process 100 returns to act 130, and proceeds as described above. If not, example process 100 completes.

The acts comprising example process 100 are described in detail in the sections that follow.

II. Determining Whether Input Defining a Query Relates to Performing a Task

At the start of example process 100, an application program receives user input (e.g., voice and/or text input) defining a search query in act 110. As described below, input defining a user-specified query may be received in any of numerous ways, via any of numerous user interfaces. Further, input defining a search query may take any suitable form, and need not comply with any predefined syntax. For example, a search query may be free-form, and comprise any information susceptible to representation via a string of one or more characters. For example, a search query may comprise a name of a person (e.g., "Tom Brady"), place (e.g., "Saratoga Springs"), thing (e.g., "New York Stock Exchange"), concept (e.g., "parenting"), pastime (e.g., "sailing"), combination thereof (e.g., "skiing in Park City"), and/or otherwise convey a user's desire to search for information on one or more topics.

User input may be received by an application program in any of a variety of ways, and in any of a variety of formats. For example, a client device may provide a number of different options from which the user may select to provide input specifying a search query. For example, a client device may allow the user to input the query in voice format (e.g., by speaking the query into a microphone integrated with or coupled to the client device) and the application program may receive the user's voice input as audio data. A client device may allow the user to input the query in text format (e.g., by typing the query on a keyboard, touch screen, mouse, and/or any other input device integrated with or coupled to the client device) and the application program may receive the user's voice input as text.

If input specifying a query is received as voice data, then automated speech recognition may be performed to obtain a recognition result (e.g., in textual form) that may be used as the basis for a query. Alternatively or additionally, one or more search engines to be queried may have a speech interface, so that audio may be provided to the search engine(s) instead of a text query based on automated speech recognition of the audio. Automated speech recognition techniques are well known, and any of a variety of automated speech recognition techniques may be used to obtain a recognition result for the audio data.

Figure 3:
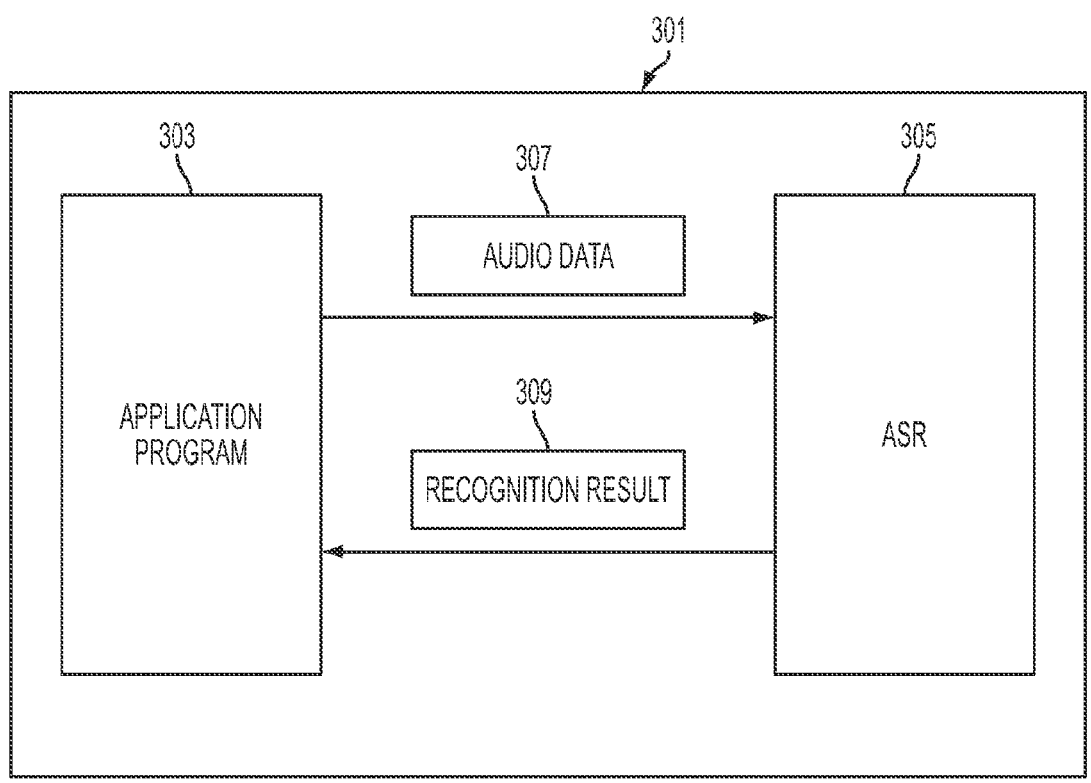
FIG. 3 is a block diagram of an example client device which executes an application program for querying multiple search engines, and an automated speech recognizer for performing speech recognition on voice search queries, in accordance with some embodiments of the invention.

In embodiments in which automated speech recognition of voice input is performed, the automated speech recognition of the user-supplied audio data may be accomplished in any of a variety of ways. For example, as shown in FIG. 3, in some embodiments, a client device may execute an automated speech recognizer in the form of one or more software programs that perform automated speech recognition on audio data, and the application program may use the automated speech recognizer to obtain a recognition result of the audio data. In FIG. 3, client device 301 executes the application program 303 that performs process 100 and an automated speech recognizer 305. When application program 303 receives user-supplied audio data 307, it may pass the audio data to automated speech recognizer 305. Automated speech recognizer 305 may perform automated speech recognition on the audio data to obtain a recognition result 309 and may return recognition result 309 to application program 303 for use in formatting queries for the speech engines.

Some client devices may not have sufficient computing resources to execute an automated speech recognizer that generates recognition results with a desired level of accuracy and/or efficiency. For example, a client device may not have sufficient memory to store acoustic models, language models, grammars, and/or other components of such a speech recognizer and/or may not have a processor powerful enough to perform automated speech recognition at a desired level of efficiency. This may occur in any number of situations, particularly when client device is a handheld device, such as a PDA or mobile phone.

Figure 4:
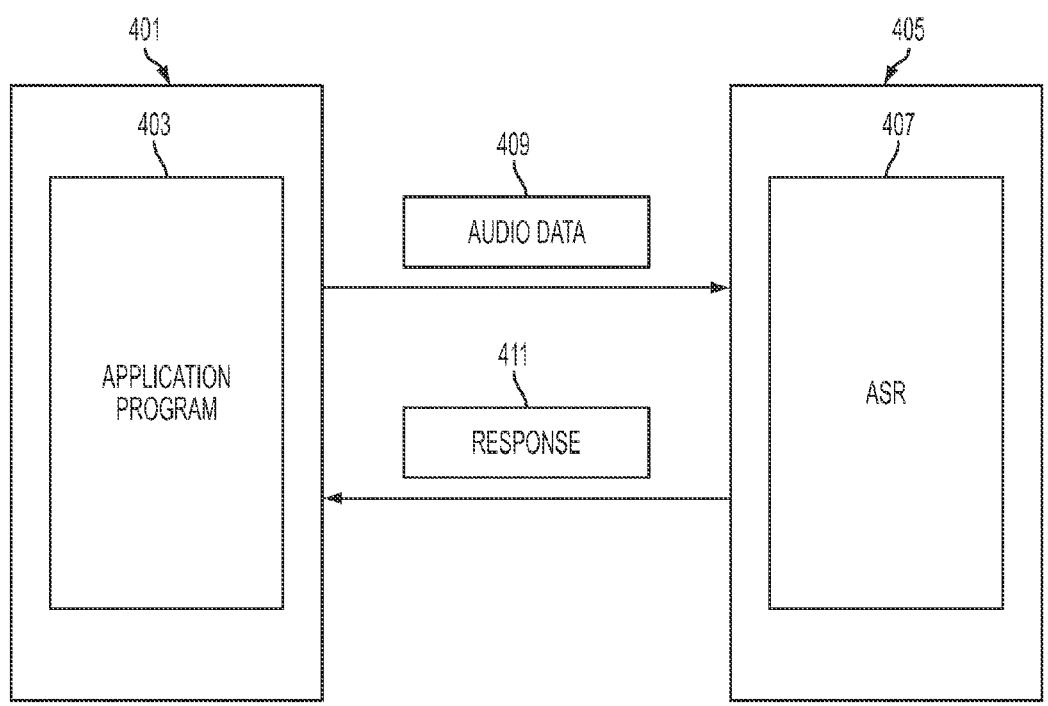
FIG. 4 is a block diagram of an example client device that executes an application program for querying multiple search engines, and a server that executes an automated speech recognizer and provides speech recognition services for the client device to perform speech recognition on voice search queries, in accordance with some embodiments of the invention.

As a result, some embodiments perform automated speech recognition on audio data supplied from a user using components on one or more computers external to the client device executing the application program that receives user input. For example, as shown in FIG. 4, client device 401 executes application program 403 that receives voice input supplied by a user in the form of audio data. Automated speech recognition may be performed on the audio data by an automated speech recognizer 407 executing on a server 405.

As shown in FIG. 4, an application program may send the user-supplied audio data 409 to automated speech recognizer 407 executing on server 405. The audio data 409 may be sent to an automated speech recognizer in any of a variety of ways. For example, in some embodiments, the user-supplied audio may be captured by a microphone, and analog-to-digital conversion may be performed on the captured microphone audio to generate digital audio data. This digital audio data may be supplied to automated speech recognizer 407. In some embodiments, some processing of the digital audio data may be performed prior to sending this data to the automated speech recognizer. For example, the digital data may be compressed or some pre-processing may be performed to extract parameters of the audio that are useful in automated speech recognition. The extracted parameters may be passed to automated speech recognizer 507 with the audio data. In embodiments that use compression, any of a variety of possible compression algorithms may be used. For example, in some embodiments, the Speex™ codec may be used. Thus, it should be appreciated that, as used herein, the term "audio data" may refer to an analog audio signal or a digital representation or compressed digital representation of an analog audio signal.

Automated speech recognizer 407 may perform automated speech recognition on audio data 409 and return to application program 403 a response 411 that comprises results from audio data 409. The results may take any suitable form. As one non-limiting example, the results may comprise a recognition result, in textual form, obtained by automated speech recognizer 407 from performing automated speech recognition on the audio data.

In the example of FIG. 3 described above, automated speech recognition of audio received at a client device is performed on the client device, and in the example of FIG. 4 described above, audio data is provided from the client device to a server, and the server performs automated speech recognition. It should be appreciated, however, that automated speech recognition may be performed partially by a client device, and partially by a server. For example, a portion of an automated speech recognizer may execute on the client device, and a portion may execute on the server. This may be done, for example, to allow the client device to perform a portion of the speech recognition process, but leave computationally intensive portions for the server.

In some embodiments, server 405 may provide automated speech recognition services for multiple client devices. FIG. 5 shows a computing environment in which each of a plurality of users 501a, 501b, . . . 501n operates a client device 503a, 503b, . . . , 503n. Each client device 503 may execute an application program that performs process 100 of FIG. 2 to send search queries (e.g., via the Internet 507) to search engines 509a, 509b, 509c, . . . , 509n, and to display the results of these search queries to their respective users. Server 505 may provide automated speech recognition services.

Thus, in embodiments in which client devices 503 receive user-supplied search queries in the form of audio data, the client devices 503 may send the audio data to server 505 to have automated speech recognition performed on the audio data, and may receive a recognition result and/or other information based on the recognition result in response.

In the example discussed above, server 505 provides automated speech recognition services for client devices 503. In some alternative embodiments, server 505 may provide additional functionality to facilitate issuance of search queries from a client device 503 to one or more of search engines 509. Some examples of this additional functionality are described in detail below.

For the sake of simplicity, in the example of FIG. 5, only one server 505 is depicted. However, it should be understood that, as is conventional for Internet servers that receive a high volume of traffic, any number of servers may be used to provide the functionality of server 505 that is described herein and the traffic load from client devices 503 may be balanced across these servers using any of a variety of load balancing techniques.

In embodiments in which a user supplies a search query by voice (i.e., in the form of audio data), a number of techniques may be used to perform automated speech recognition of the audio data to generate search queries. These techniques may be employed in embodiments in which automated speech recognition is performed on the client device, in embodiments in which automated speech recognition is performed on a computer external to the client device, and in embodiments in which automated speech recognition is performed partially on a client device and partially on a computer external to the client device.

Figure 6:
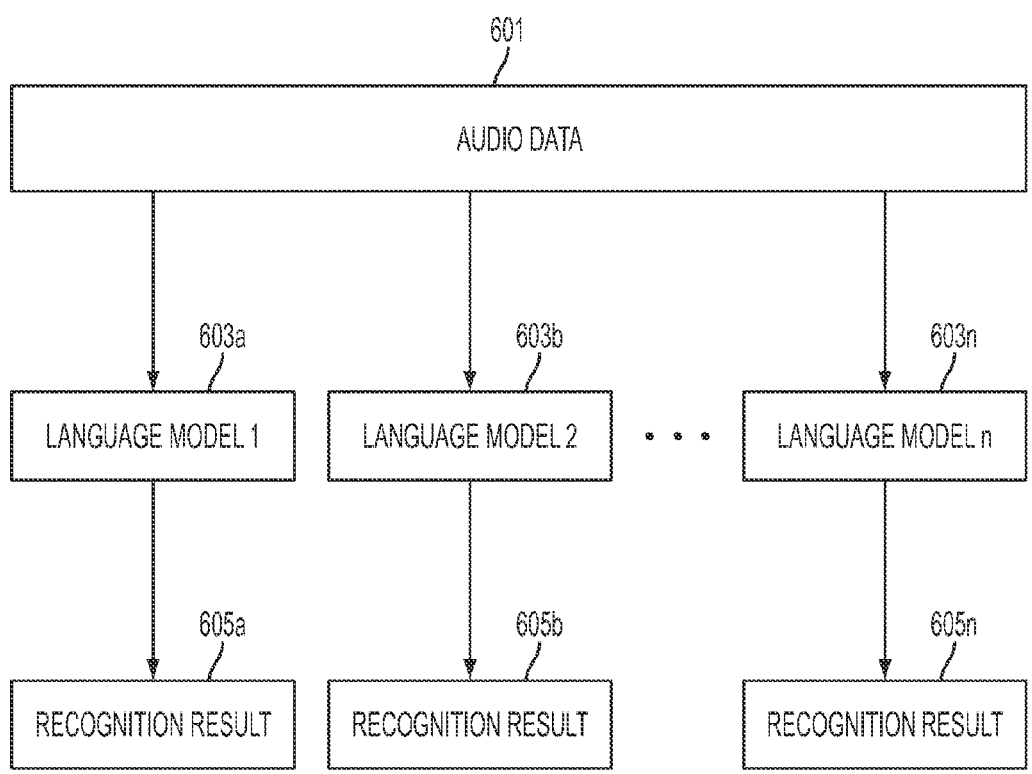
FIG. 6 is a block diagram conceptually depicting audio data of a voice speech query being recognized using multiple different language models, in accordance with some embodiments of the invention.

In some embodiments, a language model that is used by an automated speech recognizer in performing speech recognition on audio data specifying a user-supplied search query may be selected based on one or more search engines that are to be queried. For example, as shown in FIG. 6, in some embodiments, an automated speech recognizer may perform recognition on the same audio data using multiple different language models, to yield multiple different recognition results. In FIG. 6, speech recognition is performed on audio data 601 using language models 603*a*, 603*b*, . . . , 603*n* to generate recognition results 605*a*, 605*b*, . . . , 605*n*. Depending on the content of audio data 601 and the differences between language models 603, each of recognition results 605 may be the same, each may be different from the others, or some may be the same and some may be different. One or more of language models 603 may be associated with a particular search engine and the recognition result generated using a language model that is associated with a particular search engine may serve as the basis for the search query that is issued to that search engine.

Thus, in some embodiments, a language model trained on the content that is indexed by a particular search engine may be used to generate the recognition result that serves as the basis for the query that is issued to that search engine. This may result in a query that is more likely to yield relevant search results for that search engine. This technique may be particularly useful when issuing queries to site-specific search engines that index a limited amount of content that is generally directed to a particular subject area. For example, an online shoe retailer may have a site-specific search engine for its e-commerce web site. As such, the content of this web site may include shoe-specific terminology and phrases, such as the name of shoe brands and models, descriptions of shoe properties, and various other shoe-specific information. By training the language model used by a speech recognizer on the content of this web site, the recognizer may be more likely to accurately recognize speech that includes the shoe-specific terminology and phrases.

In some embodiments, if a user-supplied search query in the form of audio input is received and is to be issued to both a site-specific search engine and a general-purpose search engine, the audio input may be recognized using a first language model (e.g., a language model that has been trained on content related to the content indexed by the site-specific search engine) to generate a recognition result that serves as the basis for the query to be issued to the site-specific search engine and may also be recognized using a second language model (e.g., that has been trained on more general content), different from the first language model, to generate a recognition result that serves as the basis for the query to be issued to the general-purpose search engine.

In the example described above, the recognition result obtained by performing automated speech recognition using a language model that is associated with a particular search engine serves as the basis for the search query that is issued to that search engine. However, in some embodiments, rather than issuing recognition results obtained using different language models to different search engines, multiple recognition results may be obtained using different language models and the recognition result with the highest score or confidence value may serve as the basis of a search query that is issued to multiple search engines. For example, in FIG. 6, each of recognition results 605 may be generated by performing automated speech recognition on audio data 601 using a particular language model. In some embodiments, one of recognition results 605 may be selected to be the result that serves as the basis for generating a search query to be issued to multiple search engines. This selection may be made in any suitable way. For example, as discussed above, the recognition result that has the highest confidence value or score as a result of the speech recognition may be selected, or any other suitable criterion or combination of criteria may be used.

In situations in which speech recognition is performed on the same audio data using multiple language models, performing multiple separate and independent speech recognition processes with each of the different language models may increase the latency in obtaining recognition results and/or may increase the amount of processing resources used in performing speech recognition. Thus, in some embodiments, rather than performing an entire independent speech recognition process on the audio data for each language model, one generalized language model may be used to create a lattice of hypothesized word sequences, and this lattice may be rescored using one or more selected language models to yield recognition result(s) particularly for the selected language model(s). In this way, the time and processing resources consumed in generating the recognition results may be reduced because the same lattice is used in producing each recognition result and thus only needs to be generated once.

In the example of FIG. 6, audio data 601 is shown as being provided directly to each of language models 603. This depiction is provided merely to facilitate an understanding of how multiple language models may be used, and it should be understood that, in practice, the language models may not operate directly on audio data. For example, a lattice with multiple hypothesized sequences of words may be obtained from audio data using an acoustic model and a general language model, and specialized language models 603 may be used to rescore the general lattice and obtain a sequence of words appropriate to a specific search engine.

In some embodiments, rather than using multiple different language models in generating search queries to be provided to search engines, one language model may be selected from a plurality of available language models. For example, in some embodiments, one language model may be identified as being well-suited for recognizing a particular voice query, and that language model may be used in recognizing the query.

Any of a variety of possible criteria or combinations of criteria may be used to select a language model to be used in recognizing a particular voice query. For example, in some embodiments, the content of the query may be used as a basis for selecting a language model to be used. For example, a two-pass process may be used whereby in a first pass automatic speech recognition of a voice query or a portion of a voice query is performed using a general language model that doesn't have a specialized vocabulary. Such a language model may recognize some of the words in the query, but may not accurately recognize all of the words. The recognition result obtained from the first-pass may be used to classify the query based on topic or category. Any of a variety of well-known classification techniques may be used.

Based on the classification, a language model that has a specialized vocabulary directed to the identified topic or category may be selected. After selection of the language model, a second-pass of automated speech recognition may be performed using the selected language model. For example, if after the first-pass it is determined that the voice query includes word such as "directions," "street," or "road," it may be determined that voice query is map-related query, and a map-related language model (e.g., a language model that includes city, street, and place names for the United States and/or other countries) may be selected and used in the second-pass.

As discussed in greater detail below, the recognition result from the second-pass may serve as the basis for one or more search queries to be provided to one or more search engines. In addition, as discussed in more detail below, the search engine or engines that are queried may be selected based on the language model that was selected to recognize the query in the second-pass or the content of the recognition result obtained from the second-pass.

In some embodiments, a language model that is used to recognize a voice search query supplied from a user as audio data may be updated based on topics of interest. This may be done in any of a variety of possible ways. Current events frequently result in search engines receiving a large number of search queries that include keywords associated with a particular event, including keywords that may have been previously unused and not the subject of frequent searches. For example, if a popular new movie is playing in movie theaters, search engines may receive a large number of search queries from different users that include the name of the movie, the names of the actors in the movie, or other keywords associated with the movie. Similarly, if a large sporting event is upcoming, search engines may receive a large number of queries that include the names of the teams and/or athletes participating in the event, or an event in popular culture may thrust a person previously unknown to the general public into the limelight (e.g., a person winning the lottery, a person accused of a high-profile crime, a person involved in a high profile scandal, etc.)

In some embodiments, words and/or phrases associated with topics of recent user interest may be identified, and the language model may be updated to improve the accuracy of recognizing these words and/or phrases. These words and/or phrases may be identified in any of a variety of ways. For example, in some embodiments in which user-supplied queries (e.g., in audio format, text format, or some other format) are provided from a plurality of client devices to a server or set of servers, the server or set of servers may identify frequently used search terms or phrases in these search queries and the language model may be updated based on these frequently used search terms. In other embodiments, words and/or phrases associated with topics of interest may be identified manually by one or more humans tasked with identifying such words or phrases.

The language model may be updated in this manner with any desired degree of frequency. For example, in some embodiments, the language model may be updated at a regular interval, such as once per day, once every two days, twice per day, once per week, or any of a variety of other possible intervals. In some embodiments, the language model may be updated in response to a user action, such as an indication from the user to update the language model or in any other suitable way.

In some embodiments, words provided in user search queries, words obtained from webcrawling, and/or words from other sources may be collected and used to update the language model. A word count indicating the number of occurrences of the words in the source data may be maintained and words whose word count exceeds a threshold value may be added to the language model.

In some embodiments, an auto-pronunciation (e.g., a sequence of phonemes) for each word to be added to the language model may be generated and included in the language model with its corresponding word. In some embodiments, a human reviewer (e.g., a linguist) may review and, if warranted, revise the automatically generated pronunciation before it is added to the language model.

In some embodiments, the language model used in automated speech recognition of search queries may be updated using feedback indicating which search results a user selected. This may be done in any of a variety of possible ways. For example, in some embodiments, an automated speech recognizer may generate a recognition result from audio data of a user-supplied voice search query. This recognition result may serve as the basis for one or more search queries that are provided to one or more search engines, and search results from the one or more search engines may be returned and displayed to the user in response to the query or queries. The user may select one or more of the search results to view a particular web page or piece of content. In some embodiments, information about which search result(s) the user selected may be used to update the language model used by the automated speech recognizer. For example, a user may speak the search query "Willie Mays" and the automated speech recognizer may incorrectly recognize the speech as "Willy Maze." As such, a search query for the phrase "Willy Maze" may be issued to one or more search engines. However, one or more of the search engines may return in its list of results a hyperlink to a web page with biographical information about Willie Mays. If the user selects this hyperlink to access that web page, the content of the web page may be used to update the language model. This may increase the likelihood that the next time a user speaks the phrase "Willie Mays," it will be correctly recognized.

In some embodiments, the language model that is used for a particular user may be customized to that user's speech, using previous utterances obtained from that user. This may be done in any of a variety of ways. For example, in some embodiments, voice data received from a particular speaker may be represented as a bag-of-word feature vector, with the goal of discovering a set of representative latent speakers to "explain" the data. The outcome is that, for example, similar speakers are clustered together in a probabilistic fashion. These clusters may be used to build a set of latent speaker language model components. Using these latent components, adaptation for a particular user is performed via estimating the speaker-specific linear interpolation weights of the language model components using the received voice data from the particular speaker for which adaptation is being performed.

In some embodiments, the language model that is used for a particular user may be updated based on the user's historical browsing information. This may be accomplished in any of a variety of ways. For example, based on the user's browsing history, web sites that are frequently visited may be identified. The language model that is used to recognize speech queries may be re-trained using a training corpus in which content from the frequently visited web sites is emphasized.

Any or all of the above-described techniques for selecting a language model to facilitate automated speech recognition can be used in combination with each other. In addition, it should be appreciated that these techniques for selecting a language model need not be used, and in some embodiments the same language model may be used to process all voice input.

Referring again to FIG. 1, at the completion of act 110, the example process 100 proceeds to act 120, wherein a determination is made whether the user's specified query relates to a task for which multiple items of information are to be provided. This determination may be made in any of numerous ways.

In some embodiments of the invention, a dialogue manager may evaluate the content of a received query based on predefined criteria. In this respect, a dialogue manager, which in some embodiments is a type of software application known to those skilled in the speech recognition art, may manage a dialogue with a user when performing one or more tasks (e.g., making a restaurant reservation, making a purchase, booking a flight, booking a taxi, or other suitable task), and identify one or more items of information that are to be supplied by the user to accomplish each task. A dialogue manager may, for example, process a user-specified query to determine whether the query relates to the performance of a defined task in any suitable way, such as by evaluating the query's content to determine whether one or more predefined criteria are satisfied by the content. For example, a dialogue manager may compare query content to predefined parameters (e.g., keywords, etc.) to determine whether a query relates to a defined task. The parameters may be defined in any suitable way. In accordance with some embodiments of the invention, the parameters may be specified by one or more applications that enable the user to perform the task, such as one or more online and/or locally executing applications and/or services.

Upon determining that a query relates to performing a particular task, the dialogue manager may determine whether the items of information to be provided to accomplish the task have been supplied in the query. For example, if a query is determined to relate to a task of making a restaurant reservation, then the dialogue manager may determine whether items of information such as a restaurant name, a date, party size and time have been supplied in the user's query. If so, then the dialogue manager may determine that items of information sufficient to accomplish the task have been supplied, such that a dialogue need not be conducted with the user to collect additional information. However, if the dialogue manager determines that the items of information are not sufficient to perform the task, then the dialogue manager may identify any missing information and/or a manner of collecting it from the user. Continuing with the restaurant reservation example given above, if a user's query includes the words "I want a reservation at Mistral," then the dialogue manager may determine that the query relates to making a restaurant reservation, and that the name of a restaurant has been provided, but also that the date, party size and time have not been provided. Thus, the dialogue manager may identify and/or define a manner of collecting the information that was not provided, as described further below.

Figure 7:
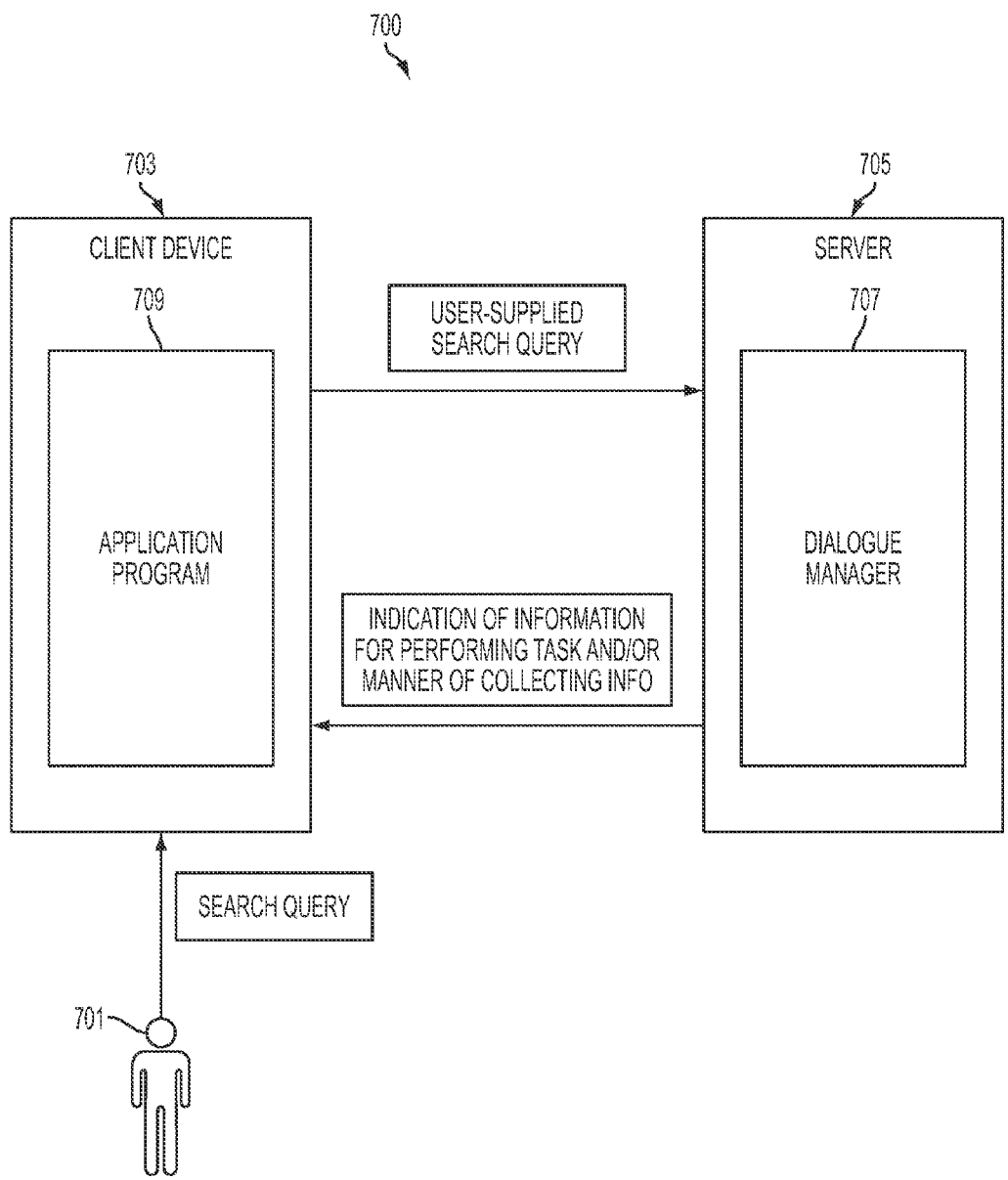
FIG. 7 is a block diagram of an example server computer that instructs a client device which search engines to query in response to receiving a user-specified search query, in accordance with some embodiments of the invention.

A dialogue manager may be implemented in any suitable computing environment. One example environment 700 is shown in FIG. 7. In the example environment shown in FIG. 7, application program 709 executing on client device 703 receives a search query from a user 701, which may be in text format, audio format, or some other format. Client device 703 transmits the user's search query (e.g., via the Internet, not shown) to dialogue manager 707 executing on server 705, which processes the user's query. Dialogue manager 707 may transmit (e.g., via the Internet and/or some other communication medium, not shown) to application program 709 an identification of information for achieving a specified task to which the user's query relates and/or a manner of collecting the information. Continuing with the example given above of a user-specified query relating to making a restaurant reservation, if the dialogue manager 707 determines that the name of a restaurant has been provided in the user's query, but that the date, party size and time have not, then the dialogue manager 707 may transmit information specifying choices from which the user may select for each of the date, party size and time, and specify a manner in which the information is to be displayed. Dialogue manager 707 may identify information for achieving a specified task and/or a manner of collecting the information in any suitable way. In accordance with one embodiment, dialogue manager 707 may store a collection of supported tasks identifying information for performing each task, so that the information may be retrieved in relation to a particular task.

It should be appreciated that the environment depicted in FIG. 7 is merely one example of an environment in which a dialogue manager may be implemented, and that a dialogue manager may be implemented in any of numerous other environments. For example, in some embodiments, components of a dialogue manager may execute on multiple separate servers, each in communication with client device 703, and the components may distribute the functionality of the dialogue manager in any suitable way. As another example, a component of the dialogue manager may reside on client device 703, or be distributed between client device 703 and server 705. Any of numerous implementations may be envisioned.

It should also be appreciated that a dialogue manager may determine whether a user-specified query relates to performing a particular task and/or identify information relating to performing the task, or in alternate embodiments may communicate with one or more other components that determine whether a query relates to performing a particular task identifies information relating to the task. For example, commonly assigned U.S. patent application Ser. No. 13/182,512 ("the '512 application"), entitled "Methods And Apparatus For Identifying And Providing Information Sought By A User," filed Jul. 14, 2011, some relevant portions of which are reproduced in Section II(A) below, describes example components and techniques for determining, upon receiving a user-specified search query, a type of information that the user seeks and/or an action which the user wishes to perform. These techniques may, for example, be used to determine that a user-specified query relates to a particular task (e.g., making a restaurant reservation), and to identify an application (e.g., provided by a website) that enables users to perform that task (e.g., make restaurant reservations). The application may then be queried to identify the items of information that are requested of a user to perform the task (e.g., make a restaurant reservation) on the site. It may then be determined whether these items of information are present in the user-specified query. If not, then the user may be prompted for any missing items of information, so that the reservation may be completed.

A. Identifying a Task to which a User's Query Relates

Figure 14:
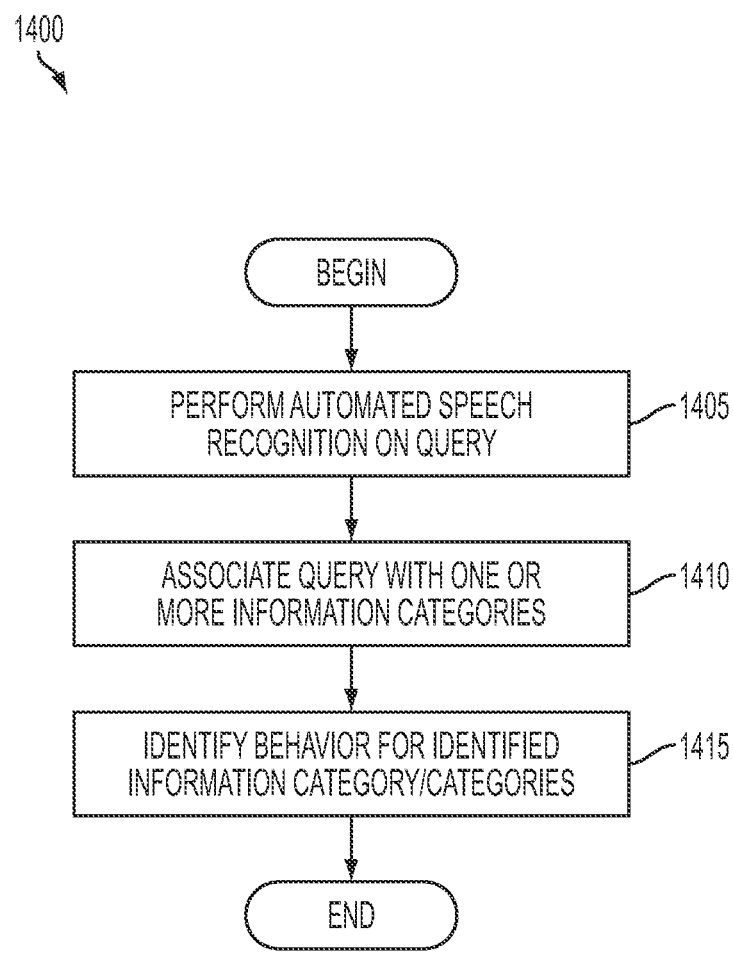
FIG. 14 is a flowchart depicting an illustrative process for identifying the type of information and/or action a user seeks.

An example process 1400 for determining, upon receiving a user-specified query, the type(s) of information that the user seeks and/or the actions(s) that the user wishes to perform is depicted in FIG. 14. The example process 1400 is but one technique which may be used to determine one or more types of information sought by the user and/or actions the user wishes to perform. Numerous other techniques for doing so are possible.

At the start of process 1400, automated speech recognition is performed on audio data defining the query in act 1405. As noted above, automated speech recognition may be performed in any of numerous ways, as embodiments of the invention are not limited to employing any particular technique(s). In some embodiments, the output of act 1405 is a textual representation of the user-specified query, comprising one or more words.

At the completion of act 1405, example process 1400 proceeds to act 1410, wherein the query is associated with one or more information categories. This may be accomplished in any of numerous ways. For example, a query may be associated with an information category based at least in part on the query's content.

For example, in some embodiments, the textual output generated in act 1405 may be processed to determine a semantic meaning for individual words and/or combinations of words in the user-specified query, and/or of the overall meaning of the query, to attempt to identify the type of information that the user seeks. For example, if a user-specified query includes the words "Starbucks® in Boston," then act 1410 may include determining that the word "Starbucks®" represents a restaurant, and that the word "Boston" represents a location. This may be accomplished in any of numerous ways. For example, any suitable natural language processing technique (of which numerous examples exist) may be employed to determine the semantic meaning of individual words, and/or combinations of words, in a user-specified query. The natural language processing may, for example, include applying, to individual words and/or combinations of words in a user-specified query, semantic tags that indicate a meaning for one or more of the words. The semantic tags may relate to any of numerous types of information. For example, a semantic tag may relate to software applications, books, movies, sports, businesses, music, television, and/or other information types. The embodiments of the invention that employ semantic tags are not limited to employing these or any other particular types of tags. Of course, embodiments of the invention are not limited to employing any particular natural language processing technique or applying semantic tags, as any suitable technique, whether now known or later developed, may be employed.

In some embodiments, the determination of one or more information categories to which a query relates and the behavior to be initiated in response is based (at least in part) on the semantic tags applied to the query. For example, a collection of possible information categories and associated behaviors may be defined, and a query may be associated with one or more of the information categories based on semantic tags that are applied to the query. Using the example "Starbucks® in Boston" query to illustrate, the collection of possible information categories may include a "restaurant" information category and a "location" information category, and queries to which the "restaurants" and "location" semantic tags are applied may be associated with these information categories. One or more behaviors can be associated with this combination of information categories, as discussed below. Of course, associating a query with one or more information categories need not be performed using a predefined collection of information categories and semantic tags. For example, information categories and/or semantic tags may be dynamically defined, using any suitable technique(s). Embodiments of the invention are not limited to any particular manner of implementation.

A user-specified query may be associated with multiple information categories that have different meanings. In this respect, the inventors have recognized that while a user submitting a query may intend one meaning for the content of the query, other meanings may also be possible. For example, a user submitting the query "Fargo" may intend to look for information relating to the city in North Dakota, but other semantic meanings are also possible (e.g., the user may seek information on the film). Thus, some embodiments of the invention enable a user-specified query to be associated with multiple information categories. For example, the word "Fargo" in the user-specified query may cause the query be associated with one information category relating to geographic locations and another relating to movies. Thus, in accordance with some embodiments of the invention, if it is determined, based on the content of a received query, that the content may have at least a first semantic meaning or a second semantic meaning that is different than the first semantic meaning, then a plurality of search engines to which to submit a representation of the query may be identified. The plurality of search engines may comprise a first search engine identified based on the first semantic meaning of the content and a second search engine identified based on the second semantic meaning of the content. A user-specified query may be associated with any suitable number of information categories, as embodiments of the invention are not limited in this respect.

In some embodiments, a user-specified query may be associated with an information category using information other than the content of the query. For example, the user's location, search history, browsing history, and/or other information may influence the association of a query with one or more information categories, and/or the prioritization of behaviors or actions taken if the query is associated with multiple categories. Using the example query "Fargo" above to illustrate, if the user's search and/or browsing history reveals that the user has a strong affinity for films, then this information may cause the query "Fargo" to be associated with the "movies" information category and not the "geographic locations" information category, or if associated with both, may treat the "movies" association as being more likely and therefore as a higher priority than the "geographic location" association in determining one or more actions to take, as discussed below. Conversely, if location data indicates that the user is in North Dakota when the query is submitted, then this information may cause the query "Fargo" to be associated with the "geographic locations" information category and not the "movies" information category, or if associated with both, may treat the "geographic locations" association as a higher priority. Any of numerous types of information may be considered when associating a user-specified query with an information category, as embodiments of the invention are not limited in this respect.

At the completion of act 1410, example process 1400 proceeds to act 1415, wherein a "behavior" for the identified one or more information categories is determined. In some embodiments, act 1415 may include identifying one or more search engines and/or other facilities making available information relevant to the one or more information categories identified in act 1410.

It should be appreciated that embodiments of the invention are not limited to submitting user-specified queries to search engines provided by websites. A behavior defined for an information category may comprise initiating and/or performing any of numerous types of actions, which may or may not include identifying one or more search engines to which a representation of the user-specified query should be submitted. For example, a behavior defined for an information category may include performing one or more native actions. In this respect, the inventors have recognized that some user-specified queries may reveal a desire on the user's part to perform an action, in addition to or rather than to search for information. As discussed in greater detail below, initiating a native action may include (as examples) launching an application, such as a media player application, map application, etc., a service (e.g., one which initiates a telephone call from a client device), and/or any other natively executed facility. Some embodiments of the invention define a behavior for a user-specified query which includes initiating one or more native actions.

Identifying a behavior to be initiated in act 1415 may be performed in any of numerous ways. In some embodiments, a defined mapping associates information categories with sets of behaviors, each set comprising one or more native actions and/or one or more search engines to which a corresponding user-specified query should be submitted. The mapping may also define a prioritization among the behaviors. As discussed above, prioritization can be based on any suitable criteria (e.g., relevance, compensation provided by the search engine, etc.). A set of behaviors may include any suitable number of native actions and/or search engines (e.g., a set need not comprise a plurality of native actions or search engines), as embodiments of the invention are not limited in this respect.

For example, a defined mapping may specify that user-specified queries associated with a "restaurant" and "location" information categories cause a set of behaviors to be initiated which includes launching one or more native actions and submitting the query to one or more search engines previously determined to be appropriate recipients for queries of the identified type. As a result, act 1415 may involve identifying one or more native actions to initiate and/or one or more search engines to which to submit the example user-specified query "Starbucks® in Boston" associated with the restaurant location information category in act 1410.

Table 1 below provides an illustrative mapping of various information categories to behaviors. Referring to the "Starbucks® in Boston" example to illustrate, Table 1 defines a mapping of user-specified queries associated with the "restaurant" and "location" information categories to a set of behaviors which includes launching a map application ("Maps," shown in the "Tab 1 (Prime)" column of Table 1), submitting a representation of the query to a search engine offered by a website providing restaurant reviews ("Yelp," shown in the "Tab 2" column), submitting a representation of the query to a general-purpose search engine so that telephone numbers included in search results may be identified and presented ("Call Tab," shown in the "Tab 3" column), submitting to a representation of the query to a search engine offered by a website providing reference information ("Wikipedia," shown in the "Tab 4" column), submitting a representation of the query to a search engine provided by a social networking website ("Twitter," shown in the "Tab 5" column), and submitting a representation of the query to a general-purpose search engine that is identified by the user ("Gen. Search 1," shown in the "Tab 6" column). Of course, Table 1 is a non-limiting example and is merely intended as an illustration of the types of behaviors that may be mapped to information categories. Embodiments of the invention are not limited to employing the mapping shown in Table 1, or indeed any mapping at all.

TABLE 1

| Search Type | Category 1 | Category 2 | Example | Native App 1 | Engine | Tab 7 | Tab 5 | Tab 3 | Tab 1 (Prime) | Tab 2 | Tab 4 | Tab 6 |
|---|---|---|---|---|---|---|---|---|---|---|---|---|
| Application Search | App | buy | buy angry birds | | Appl-Name-Buy | N/A | Gen. Search 1 | YouTube | Media Con. | Wikipedia | Images | N/A |
| Application Search | App | download | download the free wi fi app for ipad | | Appl-Name-Download | N/A | Gen. Search 1 | YouTube | Media Con. | Wikipedia | Images | N/A |
| Application Search | App | N/A | free wi fi app | | Appl-Name-NA | N/A | Gen. Search 1 | YouTube | Media Con. | Wikipedia | Images | N/A |
| Application Search | iOS App | N/A | alarm clock for ipod | | Appl-Product-NA | N/A | Gen. Search 1 | MacWorld.com (app reviews) | Media Con. | Wikipedia | YouTube | Images |
| Application Search | iOS App | N/A | iphone app review | | Appl-Product-Review | N/A | Gen. Search 1 | MacWorld.com (app reviews) | Media Con. | Wikipedia | YouTube | Images |
| Books | Author | Buy (download) | buy charles dickens | | Books-Author-Buy | N/A | Twitter | Amazon | Media Con. | Local Retail | Wikipedia | Gen. Search 1 |
| Books | Author | N/A | charles dickens | | Books-Author-NA | N/A | Twitter | Amazon | Media Con. | Local Retail | Wikipedia | Gen. Search 1 |
| Books | Author | Photos/Images | charles dickens images | | Books-Author-Photos | N/A | Twitter | Media Con. | Images | Wikipedia | Amazon | Gen. Search 1 |
| Books | Author | Play (locally) | read charles dickens | | Books-Author-Play | N/A | Twitter | Amazon | Media Con. | Local Retail | Wikipedia | Gen. Search 1 |
| Books | Title | Buy (download) | buy the girl with the dragon tattoo | | Books-Title-Buy | N/A | Twitter | Amazon | Media Con. | Local Retail | Wikipedia | Gen. Search 1 |
| Books | Title | N/A | the girl with the dragon tattoo | | Books-Title-NA | N/A | Twitter | Amazon | Media Con. | Local Retail | Wikipedia | Gen. Search 1 |
| Books | Title | Play (locally) | read the girl with the dragon tattoo | | Books-Title-Play | N/A | Twitter | Amazon | Media Con. | Local Retail | Wikipedia | Gen. Search 1 |
| Books | Title | Reviews | reviews of the girl with the dragon tattoo | | Books-Title-Review | N/A | Twitter | Amazon | NYTimes.com | Media Con. | Local Retail | Gen. Search 1 |
| Business Search | Other | Call | call nuance | direct call (if no disambiguation) | Business-Other-Call | N/A | Twitter | Maps | Call (launch app) | Yelp | Wikipedia | Gen. Search 1 |
| Business Search | Other | Directions | directions to Target | Maps App | Business-Other-Directions | N/A | Twitter | Call Tab | Yelp | Maps | Wikipedia | Gen. Search 1 |
| Business Search | Other | Location | target in boston | | Business-Other-Location | N/A | Twitter | Call Tab | Maps | Yelp | Wikipedia | Gen. Search 1 |
| Business Search | Other | N/A | Target | | Business-Other-Info | N/A | Twitter | Call Tab | Yelp | Maps | Wikipedia | Gen. Search 1 |
| Business | Other | Near Me | target near me | | Business-Other-NearMe | N/A | Twitter | Call Tab | Maps | Yelp | Wikipedia | Gen. Search 1 |

TABLE 1-continued

| Search Type | Category 1 | Category 2 | Example | Native App 1 | Engine | Tab 7 | Tab 5 | Tab 3 | Tab 1 (Prime) | Tab 2 | Tab 4 | Tab 6 |
|---|---|---|---|---|---|---|---|---|---|---|---|---|
| Business Search | Other | Photos/Images | photos of target | | Business-Other-Photos | N/A | Twitter | Maps | Images | Yelp | Call Tab | Gen. Search 1 |
| Business Search | Other | Reviews | review bestbuy | | Business-Other-Review | N/A | Twitter | Call Tab | Yelp | Maps | Wikipedia | Gen. Search 1 |
| Business Search | Restaurants | Call | call starbucks | direct call (if no disambiguation) | Business-Restaurant-Call | N/A | Wikipedia | Twitter | Call (launch app) | Yelp | Maps | Gen. Search 1 |
| Business Search | Restaurants | Directions | directions to starbucks | Maps App | Business-Restaurant-Directions | N/A | Twitter | Call Tab | Yelp | Yelp | Wikipedia | Gen. Search 1 |
| Business Search | Restaurants | Locations | starbucks in boston | | Business-Restaurant-Location | N/A | Twitter | Call Tab | Maps | Yelp | Wikipedia | Gen. Search 1 |
| Business Search | Restaurants | N/A | starbucks | | Business-Restaurant-Info | N/A | Twitter | Call Tab | Yelp | Maps | Wikipedia | Gen. Search 1 |
| Business Search | Restaurants | Near Me | starbucks near me | | Business-Restaurant-NearMe | N/A | Twitter | Call Tab | Maps | Yelp | Wikipedia | Gen. Search 1 |
| Business Search | Restaurants | Photos/Images | photos of starbucks | | Business-Restaurant-Photos | N/A | Twitter | Call Tab | Images | Yelp | Maps | Gen. Search 1 |
| Business Search | Restaurants | Reservations | starbucks reservations | | Business-Restaurant-Reservation | N/A | Twitter | Call Tab | Yelp | Maps | Wikipedia | Gen. Search 1 |
| Business Search | Restaurants | Reviews | review starbucks | | Business-Restaurant-Review | N/A | Twitter | Call Tab | Yelp | Maps | Wikipedia | Gen. Search 1 |
| Events | N/A | N/A | local events | | EventSearch-NA-NA | N/A | Twitter | Zvents.com | Eventful | LiveNation | Stubhub | Gen. Search 1 |
| General Web Search | N/A | N/A | how many organs are in the human body? | | Default | N/A | YouTube | Twitter | Gen. Search 1 | Wikipedia | Media Con. | Images |
| Maps | N/A | Directions | directions from boston to burlington | Maps App | MapSearch-NA-Directions | N/A | N/A | Images | Maps | Gen. Search 1 | Wikipedia | N/A |
| Maps | N/A | Locations | map of florida | | MapSearch-NA-Location | N/A | N/A | Images | Maps | Gen. Search 1 | Wikipedia | N/A |
| Maps | N/A | N/A | maps | | MapSearch-NA-NA | N/A | N/A | Images | Maps | Gen. Search 1 | Wikipedia | N/A |
| Movies | Actor/Director | Buy (theater) | robert de niro tickets | | Movies-ActorDirector-Tickets | N/A | Amazon | IMDB | fandango | Media Con. | Wikipedia | Gen. Search 1 |
| Movies | Actor/Director | N/A | Tom Hanks | | Movies-ActorDirector-Info | N/A | Images | Wikipedia | IMDB | Media Con. | Twitter | Gen. Search 1 |

TABLE 1-continued

| Search Type | Category 1 | Category 2 | Example | Native App 1 | Engine | Tab 7 | Tab 5 | Tab 3 | Tab 1 (Prime) | Tab 2 | Tab 4 | Tab 6 |
|---|---|---|---|---|---|---|---|---|---|---|---|---|
| Movies | Actor/Director | Photos/Images | tom hanks images | | Movies-ActorDirector-Photos | N/A | fandango | IMDB | Images | Wikipedia | Media Con. | Gen. Search 1 |
| Movies | Actor/Director | Play (locally) | play brad pitt movies | | Movies-ActorDirector-Play | N/A | Twitter | IMDB | Media Con. | Wikipedia | Images | Gen. Search 1 |
| Movies | N/A | Info | movie information | | Movies-NA-Info | N/A | Media Con. | Twitter | IMDB | fandango | rottentomatoes | Gen. Search 1 |
| Movies | N/A | Review | movie reviews | | Movies-NA-Review | N/A | fandango | Twitter | rottentomatoes | IMDB | Media Con. | Gen. Search 1 |
| Movies | N/A | Schedule | movie schedules | | Movies-NA-Schedule | N/A | Media Con. | Twitter | fandango | IMDB | rottentomatoes | Gen. Search 1 |
| Movies | Title | Play (locally) | Play avatar | Play media | Movies-Title-Play | N/A | rottentomatoes | Twitter | Media Con. | IMDB | Wikipedia | Gen. Search 1 |
| Movies | Title | Play (stream) | stream avatar | | Movies-Title-Stream | N/A | rottentomatoes | Twitter | Media Con. | IMDB | Wikipedia | Gen. Search 1 |
| Movies | Title | Schedule | showtimes for avatar | | Movies-Title-Schedule | N/A | rottentomatoes | Twitter | Media Con. | IMDB | Wikipedia | Gen. Search 1 |
| Movies | Title | Song | seabiscuit theme song | | Movies-Title-Song | N/A | Twitter | IMDB | fandango | rottentomatoes | Wikipedia | Gen. Search 1 |
| Movies | Title [in theaters] | Buy (theater) | tickets for inception | | Movies-Title-Tickets | N/A | Twitter | fandango | IMDB | rottentomatoes | Wikipedia | Gen. Search 1 |
| Movies | Title [in theaters] | N/A | inception | | Movies-Title-Info | N/A | fandango | IMDB | rottentomatoes | rottentomatoes | Wikipedia | Gen. Search 1 |
| Movies | Title [in theaters] | Photos/Images | inception photos | | Movies-Title-Photos | N/A | Media Con. | IMDB | Images | Wikipedia | Wikipedia | Gen. Search 1 |
| Movies | Title [in theaters] | Review | inception review | | Movies-Title-Review | N/A | IMDB | Amazon | rottentomatoes | fandango | Wikipedia | Gen. Search 1 |
| Movies | Title [not in theaters] | Buy (download) | buy avatar | | Movies-Title-Buy | N/A | Twitter | Media Con. | Media Con. | Local Retail | rottentomatoes | Gen. Search 1 |
| Movies | Title [not in theaters] | N/A | avatar | | Movies-Title-Info | N/A | Gen. Search 1 | IMDB | IMDB | rottentomatoes | Wikipedia | Gen. Search 1 |
| Movies | Title [not in theaters] | Photos/Images | avatar photos | | Movies-Title-Photos | N/A | Twitter | IMDB | Images | Wikipedia | Media Con. | Gen. Search 1 |
| Movies | Title [not in theaters] | Review | avatar review | | Movies-Title-Review | N/A | LiveNation | Twitter | rottentomatoes | Wikipedia | Wikipedia | Gen. Search 1 |
| Music | Artist | Buy (download) | buy lady gaga music | | Music-Artist-Buy | N/A | LiveNation | Amazon | Media Con. | Local Retail | Wikipedia | Gen. Search 1 |
| Music | Artist | N/A | lady gaga | | Music-Artist-Info | N/A | Gen. Search 1 | Twitter | Media Con. | Wikipedia | Images | Gen. Search 1 |
| Music | Artist | N/A | joe lean on goodfellas | | Music-Artist-Movie | N/A | LiveNation | IMDB | Media Con. | Media Con. | Twitter | Images |
| Music | Artist | Photos/Images | show me a photo of lady gaga | | Music-Artist-Photos | N/A | LiveNation | Twitter | Images | Wikipedia | Wikipedia | Gen. Search 1 |
| Music | Artist | Play (locally) | play lady gaga | Play media in background | Music-Artist-Play | N/A | LiveNation | Twitter | Media Con. | Wikipedia | Images | Gen. Search 1 |
| Music | Artist | Radio (stream) | stream lady gaga songs | Pandora | Music-Artist-Stream | N/A | LiveNation | Twitter | Media Con. | Wikipedia | Images | Gen. Search 1 |
| Music | Artist | Tickets (buy) | lady gaga tickets | | Music-Artist-Tickets | N/A | Media Con. | Twitter | LiveNation | StubHub | Wikipedia | Gen. Search 1 |

TABLE 1-continued

| Search Type | Category 1 | Category 2 | Example | Native App 1 | Engine | Tab 7 | Tab 5 | Tab 3 | Tab 1 (Prime) | Tab 2 | Tab 4 | Tab 6 |
|---|---|---|---|---|---|---|---|---|---|---|---|---|
| Music | Song/Album | Buy (download) | buy album love | | Music-Album/Song-Buy | N/A | Twitter | Amazon | Media Con. | Local Retail | Wikipedia | Gen. Search 1 |
| Music | Song/Album | N/A | macarena | | Music-Song-Info | N/A | YouTube | Twitter | Media Con. | Wikipedia | Gen. Search 1 | N/A |
| Music | Song/Album | Play (locally) | play macarena | Play media in background | Music-Album/Song-Play | N/A | N/A | Twitter | Media Con. | Wikipedia | Gen. Search 1 | N/A |
| Music | Song/Album | Radio (stream) | stream album love love love | Pandora | Music-Album/Song-Stream | N/A | N/A | Twitter | Media Con. | Wikipedia | Gen. Search 1 | N/A |
| Music Videos | Artist | N/A | lady gaga videos | | Videos-Artist-Info | N/A | LiveNation | YouTube | Media Con. | Wikipedia | Twitter | Gen. Search 1 |
| Music Videos | Artist | Play (locally) | play lady gaga music videos | Play media in background | Videos-Artist-Play | N/A | LiveNation | YouTube | Media Con. | Wikipedia | Twitter | Gen. Search 1 |
| Music Videos | Artist | Play (stream) | stream lady gaga music videos | | Videos-Artist-Stream | N/A | LiveNation | YouTube | Media Con. | Wikipedia | Twitter | Gen. Search 1 |
| Music Videos | Song | Play (locally) | play the music video for macarena | Play media in background | Videos-Song-Play | N/A | Twitter | YouTube | Media Con. | Wikipedia | Gen. Search 1 | N/A |
| Music Videos | Song | Play (stream) | stream the music video for macarena | | Videos-Song-Stream | N/A | Twitter | Twitter | Media Con. | Wikipedia | Gen. Search 1 | N/A |
| News | N/A | N/A | Haiti earthquake | | News-NA-NA | N/A | YouTube | Twitter | CNN | NYTimes.com | Images | Gen. Search 1 |
| News | User Specified Site | N/A | USAToday | | News-SpecSite-NA | Gen. Search 1 | Images | NYTimes.com | User Specified Site | CNN | Twitter | YouTube |
| Product Search | Local Retail | N/A | call of duty | | Product-Game-Info | N/A | Twitter | Nextag | Amazon | Local Retail | IGN | Gen. Search 1 |
| Product Search | Local Retail | N/A | iphone | | Product-NA-Info | N/A | Twitter | Nextag | Amazon | Local Retail | Images | Gen. Search 1 |
| Product Search | Local Retail | N/A | iphone review | | Product-NA-Review | N/A | Twitter | Nextag | Amazon | Local Retail | Images | Gen. Search 1 |
| Product Search | Local Retail | Reviews | call of duty review | | Product-Game-Review | N/A | Twitter | Amazon | IGN | Local Retail | Nextag | Gen. Search 1 |
| Product Search | N/A | N/A | ipod near by | | Product-LocalRetail-NA | N/A | Gen. Search 1 | Amazon | Local Retail | Nextag | Twitter | Images |
| Product Search | N/A | Photos/Images | iphone photos | | Product-NA-Photos | N/A | Nextag | Amazon | Images | Local Retail | Twitter | Gen. Search 1 |
| Social Search | Facebook | N/A | marc regan on facebook | | URL-NA-NA | N/A | Gen. Search 1 | MySpace | Facebook | Twitter | Images | N/A |
| Social Search | MySpace | N/A | marc regan on myspace | | URL-NA-NA | N/A | Gen. Search 1 | Twitter | MySpace | Facebook | Images | N/A |

TABLE 1-continued

| Search Type | Category 1 | Category 2 | Example | Native App 1 | Engine | Tab 7 | Tab 5 | Tab 3 | Tab 1 (Prime) | Tab 2 | Tab 4 | Tab 6 |
|---|---|---|---|---|---|---|---|---|---|---|---|---|
| Social Search | Twitter | N/A | marc regan on twitter | | URL-NA-NA | N/A | Gen. Search 1 | MySpace | Twitter | Facebook | Images | N/A |
| Sports | Athlete | Biography | michael jordan biography | | Sports-Athlete-Bio | N/A | Gen. Search 1 | Twitter | Wikipedia | ESPN | Images | N/A |
| Sports | Athlete | N/A | michael jordan | | Sports-Athlete-NA | N/A | Gen. Search 1 | Twitter | ESPN | Wikipedia | Images | N/A |
| Sports | Athlete | Photos/Images | photos of michael jordan | | Sports-Athlete-Photos | N/A | Gen. Search 1 | Twitter | Images | Wikipedia | Wikipedia | N/A |
| Sports | Athlete | Statistics | michael jordan statistics | | Sports-Athlete-Stats | N/A | Gen. Search 1 | Wikipedia | ESPN [player stats] | Wikipedia | Images | N/A |
| Sports | Sport Type | N/A | NBA | | Sports-SportType-Info | N/A | Twitter | Wikipedia | ESPN | Gen. Search 1 | Images | N/A |
| Sports | Sport Type | News | NBA news | | Sports-SportType-Info | N/A | Twitter | Wikipedia | ESPN [league news] | Gen. Search 1 | Images | N/A |
| Sports | Sport Type | Photos/Images | NHL photos | | Sports-SportType-Photos | N/A | Twitter | ESPN | Images | Wikipedia | Gen. Search 1 | N/A |
| Sports | Sport Type | Schedule | NBA schedule | | Sports-SportType-Info | N/A | Twitter | Wikipedia | ESPN [league schedule] | Gen. Search 1 | Images | N/A |
| Sports | Sport Type | Scores | NBA scores | | Sports-SportType-Info | N/A | Twitter | Wikipedia | ESPN [league scores] | Gen. Search 1 | Images | N/A |
| Sports | Sport Type | Standings | NBA standings | | Sports-SportType-Info | N/A | Twitter | Wikipedia | ESPN [league standings] | Gen. Search 1 | Images | N/A |
| Sports | Sport Type | Statistics | NBA stats | | Sports-SportType-Info | N/A | Twitter | Wikipedia | ESPN [league stats] | Gen. Search 1 | Images | N/A |
| Sports | Sport Type | Tickets | football tickets | | Sports-SportType-Tickets | N/A | Twitter | ESPN | StubHub | TicketMaster | Gen. Search 1 | N/A |
| Sports | Team | N/A | dallas cowboys | | Sports-Team-Info | N/A | Gen. Search 1 | Wikipedia | ESPN | Twitter | Images | N/A |
| Sports | Team | News | dallas cowboys news | | Sports-Team-Info | N/A | Gen. Search 1 | Wikipedia | ESPN [team news] | Twitter | Images | N/A |
| Sports | Team | Photos/Images | boston bruins photos | | Sport-SportType-Photos | N/A | Twitter | ESPN | Images | Wikipedia | Gen. Search 1 | N/A |
| Sports | Team | Schedule | dallas cowboys schedule | | Sports-Team-Info | N/A | Gen. Search 1 | Wikipedia | ESPN [team schedule] | Twitter | Images | N/A |
| Sports | Team | Scores | dallas cowboys scores | | Sports-Team-Info | N/A | Gen. Search 1 | Wikipedia | ESPN [team scores] | Twitter | Images | N/A |
| Sports | Team | Standings | dallas cowboys standings | | Sports-Team-Info | N/A | Gen. Search 1 | Wikipedia | ESPN [team standings] | Twitter | Images | N/A |
| Sports | Team | Statistics | dallas cowboys stats | | Sports-Team-Info | N/A | Gen. Search 1 | Wikipedia | ESPN [team stats] | Twitter | Images | N/A |
| Sports | Team | Tickets | Tickets for dallas cowboys games | | Sports-Team-Tickets | N/A | Twitter | ESPN [team] | StubHub | TicketMaster | Gen. Search 1 | N/A |
| Sports | Team | Tickets | find me chicago blackhawks tickets | | Sports-Team-Tickets | N/A | Twitter | ESPN [team] | StubHub | TicketMaster | Gen. Search 1 | N/A |

TABLE 1-continued

| Search Type | Category 1 | Category 2 | Example | Native App 1 | Engine | Tab 7 | Tab 5 | Tab 3 | Tab 1 (Prime) | Tab 2 | Tab 4 | Tab 6 |
|---|---|---|---|---|---|---|---|---|---|---|---|---|
| Television | Actor/Director | Buy (download) | buy David Letterman shows | | Tv-Actor-Buy | N/A | IMDB | Amazon | Media Con. | Local Retail | Gen. Search 1 | N/A |
| Television | Actor/Director | Buy (store) | buy David Letterman on DVD | | Tv-Actor-Buy | N/A | IMDB | Media Con. | Amazon | Local Retail | Gen. Search 1 | N/A |
| Television | Actor/Director | N/A | David Letterman | | Tv-Actor-Info | N/A | Gen. Search 1 | IMDB | Wikipedia | Twitter | Media Con. | Images |
| Television | Actor/Director | Photos/Images | David Letterman photos | | Tv-Actor-Photos | N/A | Gen. Search 1 | Twitter | Images | Wikipedia | IMDB | Media Con. |
| Television | Actor/Director | Play (locally) | play David Letterman shows | | Tv-Actor-Play | N/A | Twitter | IMDB | Media Con. | Wikipedia | Gen. Search 1 | N/A |
| Television | Actor/Director | Play (stream) | stream David Letterman shows | | Tv-Actor-Stream | N/A | Twitter | IMDB | Media Con. | Wikipedia | Gen. Search 1 | N/A |
| Television | Title | Buy (download) | buy married with children | | Tv-Title-Buy | N/A | IMDB | Amazon | Media Con. | Local Retail | Twitter | Gen. Search 1 |
| Television | Title | Buy (store) | buy married with children on blu-ray | | Tv-Title-Buy | N/A | IMDB | Media Con. | Amazon | Local Retail | Twitter | Gen. Search 1 |
| Television | Title | N/A | married with children | | Tv-Title-Info | N/A | IMDB | Amazon | Media Con. | Local Retail | Twitter | Gen. Search 1 |
| Television | Title | Photos/Images | married with children photos | | Tv-Title-Photos | N/A | IMDB | Media Con. | Images | Twitter | Gen. Search 1 | N/A |
| Television | Title | Play (locally) | play married with children | | Tv-Title-Play | N/A | IMDB | Amazon | Media Con. | Local Retail | Twitter | Gen. Search 1 |
| Television | Title | Play (stream) | stream married with children | | Tv-Title-Stream | N/A | IMDB | Amazon | Media Con. | Local Retail | Twitter | Gen. Search 1 |
| Television | Title | Song | punky brewster theme song | | Tv-Title-Song | N/A | N/A | IMDB | Media Con. | Amazon | Gen. Search 1 | N/A |
| User Specified Site | Content Type KNOWN | | call of duty 4 review on joystiq.com | | URL-NA-NA | Tab 6 | Tab 4 | Tab 2 | User Specified Site | Tab 1 (prime) | Tab 3 | Tab 5 |
| User Specified Site | Content Type UNKNOWN | amazon | Phillips razor on Amazon | | URL-NA-NA | N/A | Gen. Search 1 | eBay | Amazon | Local Retail | Images | N/A |
| User Specified Site | Content Type UNKNOWN | buy | Phillips razor on Buy.com | | URL-NA-NA | N/A | Gen. Search 1 | Amazon | Buy | Local Retail | eBay | Images |
| User Specified Site | Content Type UNKNOWN | ebay | Phillips razor on Ebay | | URL-NA-NA | N/A | Gen. Search 1 | Amazon | eBay | Local Retail | Images | N/A |

TABLE 1-continued

| Search Type | Category 1 | Category 2 | Example | Native App 1 | Engine | Tab 7 | Tab 5 | Tab 3 | Tab 1 (Prime) | Tab 2 | Tab 4 | Tab 6 |
|---|---|---|---|---|---|---|---|---|---|---|---|---|
| User Specified Site | Content Type UNKNOWN | Google maps-directions | directions to walmart on Google maps | Google maps | URL-NA-NA | Tab 7 | Tab 5 | Tab 3 | Google maps | Tab 2 | Tab 4 | Tab 6 |
| User Specified Site | Content Type UNKNOWN | Google maps-other | Boston on Google maps | | URL-NA-NA | Tab 7 | Tab 5 | Tab 3 | Google maps | Tab 2 | Tab 4 | Tab 6 |
| User Specified Site | Content Type UNKNOWN | lastfm | lady gaga on last fm | | URL-NA-NA | Tab 6/7 | Tab 4 | Tab 2 | User Specified Site | Tab 1(prime) | Tab 3 | Tab 5 |
| User Specified Site | Content Type UNKNOWN | pandora | lady gaga on pandora | Pandora | URL-NA-NA | Tab 6/7 | Tab 4 | Tab 2 | User Specified Site | Tab 1(prime) | Tab 3 | Tab 5 |
| User Specified Site | Content Type UNKNOWN | | hotel reviews on livejournal.com | | URL-NA-NA | Tab 6/7 | Tab 4 | Tab 2 | User Specified Site | Tab 1(prime) | Tab 3 | Tab 5 |
| Videos | Title | Buy | buy video my fair lady | | Videos-Title-Buy | N/A | YouTube | eBay | Media Con. | Amazon | Local Retail | Gen. Search 1 |
| Videos | Title | Stream | stream video my fair lady | | Videos-Title-Stream | N/A | eBay | YouTube | Media Con. | Amazon | Local Retail | Gen. Search 1 |
| Videos (generic) | N/A | N/A | dog tricks videos | | Videos-NA-NA | N/A | Amazon | Twitter | YouTube | Media Con. | Gen. Search 1 | N/A |
| Weather | N/A | N/A | Current weather | | Weather-NA-NA | N/A | N/A | wunderground.com | accuweather.com | weather | Gen. Search 1 | N/A |

As can be seen from Table 1, user-specified queries associated with different information categories may be mapped to different sets of behaviors. For example, a user-specified query associated with the "Title [in theaters]" and "Buy [Theater]" information categories may be submitted to a set which includes a search engine provided by a website enabling users to purchase movie tickets ("fandango," shown in the "Tab 1 (Prime)" column of Table 1), a search engine offered by a website providing movie reviews ("rottentomatoes," shown in the "Tab 2" column), a search engine offered by a website providing movie information ("IMDB," shown in the "Tab 3" column), a search engine offered by a website providing reference information ("Wikipedia," shown in the "Tab 4" column), a search engine provided by a social networking website ("Twitter," shown in the "Tab 5" column), and a general-purpose search engine identified by the user ("Gen. Search 1," shown in the "Tab 6" column). Any suitable number and type of behaviors may be mapped to a set of information categories, as embodiments of the invention are not limited in this respect.

It should be appreciated that embodiments of the invention are not limited to employing a pre-defined mapping of information categories to sets of search engines and/or native actions. Any suitable technique(s) may be employed to determine a set of behaviors appropriate for a user-specified query associated with a particular information category. For example, if a set of behaviors includes submitting a query to one or more search engines, the search engine(s) may be identified dynamically, such as based on the content of the query, and/or other information. For example, the presence and/or accuracy of location data provided with a user-specified query may be used at least partially to determine which search engine(s) are identified in act 1415.

It should be appreciated that identifying search engines to which a user-specified query should be submitted, in accordance with some embodiments of the invention, offers the opportunity to make the particular type of information determined to be that which the user seeks available to him/her more quickly than conventional approaches may allow. Using the above example query "Starbucks® in Boston" to illustrate, a conventional approach to searching for Starbucks®' locations in Boston may entail the user submitting the same example query to a general-purpose search engine. While the results returned by the general-purpose search engine may include pages provided by similar sites to those identified in the example above (i.e., by a site providing access to map data, a site providing restaurant reviews, a site providing reference information, etc.), there is no guarantee that results from these sites will be included in the results. Further, even if the results include pages from sites similar to those identified in the example, the user may be forced to sift through other results that are unrelated to the particular information that he/she seeks. For example, a general-purpose search engine may respond to the query "Starbucks® in Boston" by generating results including links to sites providing information on other restaurants in Boston, information on the Starbucks® corporation, information on the city of Boston, etc.

None of this is the information the user seeks, but the user must review (at least superficially) all of it to locate the type of information he/she ultimately seeks. In addition, if the user is interested in information from a website providing map data, the user must select that link in the saved search results restored, as these results are not directly presented. Thus, conventional approaches may require a user to expend unnecessary amounts of time and mental energy to locate information of a particular type. By contrast, embodiments of the invention may identify, upon receiving a user's query, the particular type of information that the user seeks, and attempt to immediately present information of that type to the user (e.g., based on an estimated similarity between the content of the query, and/or other information, and content made available by one or more search engines). As a result, embodiments of the invention may reduce the time and cognitive load associated with locating a particular type of information. Using the example above to illustrate, the user may be immediately presented with results from a plurality of search engines, for instance, map data showing the locations of Starbucks® restaurants in Boston, reviews of various Starbucks® locations in Boston, etc.

It should be appreciated that by identifying a plurality of search engines to which queries for information of a particular type should be submitted, embodiments of the invention can be aggressive in attempting to immediately present a specific type of information the user is believed to seek, because other less specific information can simultaneously be provided as a fallback option in case the aggressive, specific approach turns out to misapprehend the user's intent. As an example, for queries associated with a particular information category, embodiments of the invention may identify one or more "most aggressive" options (e.g., provided one or more sites making available specialized information that is closely related to a particular information category). In the example given above, these options may be the site providing access to map data and/or restaurant reviews. As described in further detail below, results generated by the most aggressive option(s) may be presented more prominently than results generated by other, less specific options. In some embodiments, the freedom to present specialized information prominently in response to a search is afforded by the other, less aggressive search engines in the identified set, which provide fallback options in case the specialized information is not the type that the user seeks. In the example above, these options are provided by the search engines provided by sites making available reference information, etc. Thus, if the primary options do not provide the type of information the user seeks, the alternatives also presented may provide more generalized information that may encompass the type of information which the user seeks. In addition, even if the most aggressive option provides the type of information that the user initially sought, these fallback options may provide access to other information related to the specific type of information which the most aggressive option provides, but which the user may not have thought to search for, or may have intended to also search for after completing an initial search.

In some embodiments, identifying a set of search engines to which a user-specified query should be submitted may involve identifying one or more search engines for each of multiple potential meanings of the content of the query. In this respect, as noted above, a user-specified query may be associated in act 1410 with more than one information category, perhaps because the content of the user's query is identified as having more than one potential meaning. If a user-specified query is associated with more than one information category in act 1410, then identifying in act 1415 a behavior (e.g., a set of search engines to which the query should be submitted) may entail any of numerous actions. For example, in some embodiments, act 1415 may include identifying which potential meaning is most likely to be the meaning intended by the user. This may be accomplished in any of numerous ways. For example, the user's location, search history, browsing history, and/or other information may be analyzed to determine a probability that the user intended each potential meaning, using any of numerous techniques. Using the "Fargo" example query given above to illustrate, if the user has recently searched for information on other films and is not currently located in North Dakota, then it may be determined that it is more probable that the user intended to search for information on the film Fargo, and less probable that the user intended to search for information on the city. As a result, the set of search engines identified as being the ones to which the query should be submitted, and/or the ones from which results should be most prominently displayed, may be the ones associated with the movies information category rather than the geographic locations information category.

As mentioned above, embodiments of the invention are not limited to determining which potential meaning is most likely and identifying only a set of search engines to which the query should be submitted on this basis, as queries can be submitted to different search engines based on alternative semantic meanings. Thus, in some embodiments, for the example query "Fargo," a set of search engines may, for example, be identified which includes a first search engine provided by a website that makes available information on films, a second search engine provided by a website that makes available information on geographic locations, a third, general-purpose search engine, etc., so that more than one potential meaning may be represented in the results generated. In alternate embodiments, if multiple potential meanings for a user-specified query are identified, only general-purpose search engines may be identified as that to which the user's query should be submitted, since more than one potential meaning may be represented in the results generated by the general-purpose search engine.

Further, if a user-specified query cannot be associated with any information categories in act 1410 (e.g., because no semantic tags are applied to the query, so that the query is not associated with an information category), then act 1415 may include identifying one or more general-purpose search engines as the search engine(s) to which the user's query should be submitted. Embodiments of the invention may process a query which cannot be associated with an information category in any suitable fashion.

In some embodiments, the number of search engines identified in act 1415 may differ depending on the information category or categories to which the query is mapped, and the number and type of search engines relevant thereto. For example, act 1415 may include, for a user-specified query mapped to the restaurant locations information category in act 1410, identifying a first quantity of search engines to which the query should be submitted. For a user-specified query mapped to the geographic locations information category in act 1410, act 1415 may include identifying a different quantity of search engines to which the query should be submitted. Queries mapped to multiple information categories, or mapped to no information categories, may have different numbers of search engines identified. Any suitable number of search engines may be identified for any user-specified query, as embodiments of the invention are not limited in this respect.

At the completion of act 1415, process 1400 completes.

B. Identifying Items of Information Relating to a Task

Figure 8:
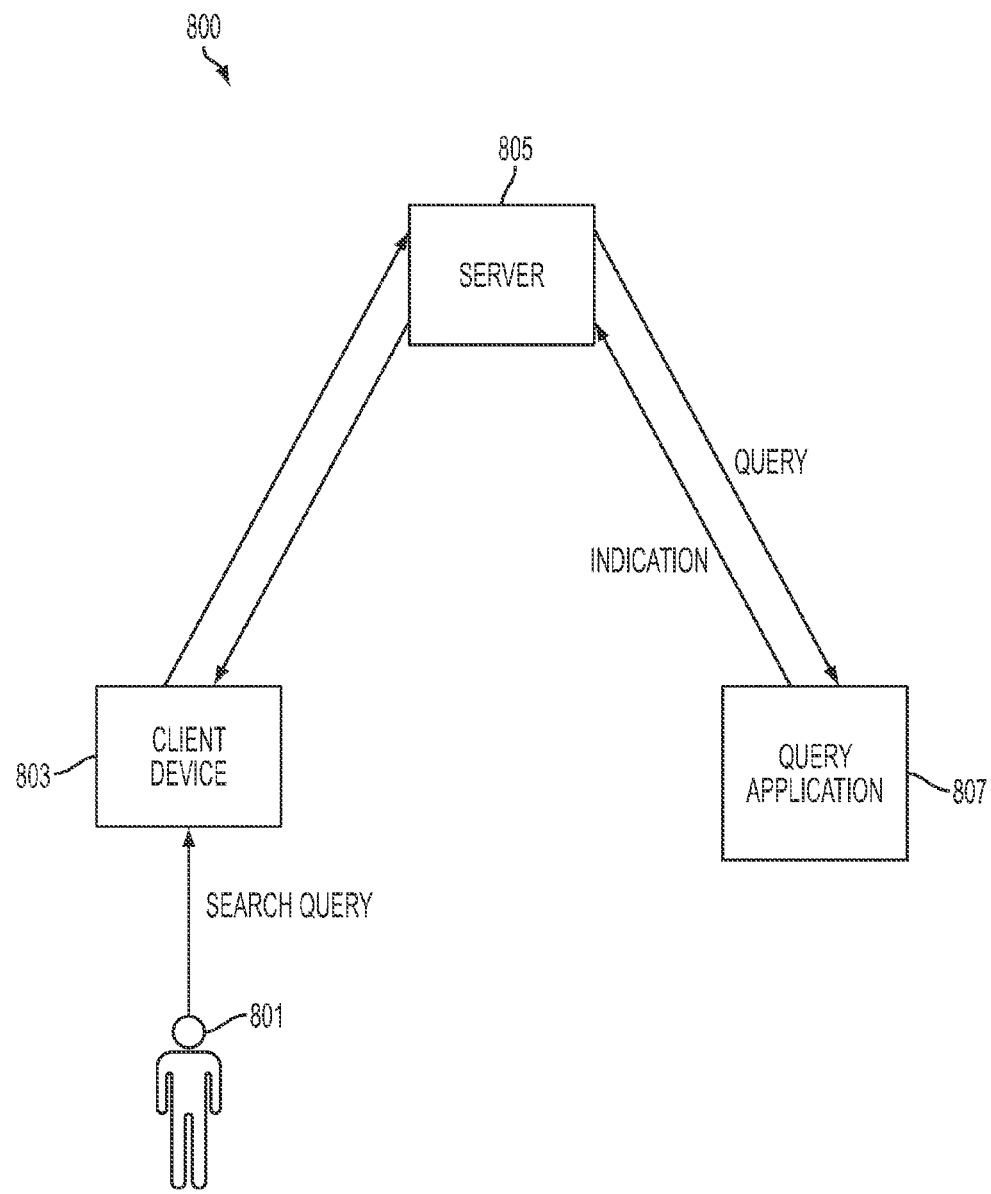
FIG. 8 is a flowchart depicting an example process through which it may be determined whether a user-specified query relates to a task for which more information is to be provided.

An example technique for querying a search engine or other application to identify items of information relating to performing a particular task is depicted in FIG. 8. In the example shown, client device 803 receives from user 801 a search query, which may be in text format, audio format, or some other format. Client device 803 transmits the user's search query via a communication medium (e.g., the Internet) to server 805, which processes the user's query to determine the type of task which the user seeks to perform, and to identify one or more search engines or other web applications (e.g., websites) that allow users to perform that task. This may be performed, for example, using the techniques described above with reference to FIG. 14. In the example shown in FIG. 8, search engine or application 807 (referred to collectively as a "query application," as a user's query may be directed to it) is identified as enabling users to perform the identified task.

Items of information which are requested of a user to perform the identified task are then identified. This may be performed in any of numerous ways. For example, query application 807 may make publicly available the items of information that are requested of a user to perform particular tasks, such as via an API. If so, then the items of information may be identified prior to a user's query being received by client device 803, and stored for retrieval (e.g., by server 805). Alternatively, identification may be performed automatically. For example, server 805 may issue a query to query application 807 to identify requested items of information. For example, if the user's query is determined by server 805 to relate to making a restaurant reservation, then server 805 may issue a request to query application 807 to identify items of information which are requested of users attempting to make a restaurant reservation. Query application 807 may respond to the query by providing an indication that, for example, a restaurant name, date, party size and time are requested of users.

Upon identifying the requested items of information, server 805 may determine whether these items of information are present in the user-specified query. If not, server 805 may identify any missing items of information to client device 803. Continuing with the restaurant reservation example, if server 805 determines that a restaurant name is specified in the user's query, but not the date, party size and time, then server 805 may indicate to client device 803 that the date, party size and time have not yet been provided by the user. In some embodiments, the server 805 may also specify a manner in which the user should be prompted for the information. In other embodiments, the client device may determine the manner of prompting the user.

Of course, it should be appreciated that the example technique(s) described above for determining whether a user-specified query relates to performing a task, and identifying information relating to the performance of that task, are illustrative, non-limiting examples, and that any suitable technique(s) may alternatively be employed. Embodiments of the invention are not limited in this respect.

III. Conducting a Dialogue with a User

Figure 9:
FIG. 9 is a diagram of a display of a client device for displaying search results from multiple search engines, and conducting a dialogue with a user, in accordance with some embodiments of the invention.

Referring again to FIG. 1, if it is determined in act 120 that information relating to the task is to be collected from the user, then example process 100 proceeds to act 130, wherein the user is prompted for the information. A user may be prompted for information in any of numerous ways, using any suitable user interface. In some embodiments of the present invention, a display screen may be employed to prompt a user for information. An example screen interface 900 for display on a display screen is shown in FIG. 9.

Example screen interface 900 illustrates elements from the Dragon Go! application made available by Nuance Communications, Inc., of Burlington, Mass., for mobile telephones and other mobile devices (e.g., tablet computers). In this respect, example screen interface 900 employs a carousel metaphor in which the carousel has multiple slots, each slot displaying an icon corresponding to one of the search engines from which search results are received. Specifically, example screen interface 900 includes carousel 901, having slots 920, 925, 930, 935, and 940. A user selects (e.g., by tapping, clicking, etc.) one of the slots in the carousel 901 to cause results generated by the search engine corresponding to the slot to be displayed in area 905. An indicator 907 indicates which slot has been selected, identifying to the user the search engine for which results are shown in area 905. In the example shown, indicator 907 indicates that slot 930 has been selected, identifying to the user that results from the search engine identified by the icon in slot 930 are shown in area 905. Query field 909 indicates the search query that was issued to the search engines identified in carousel 901.

Example screen interface 900 also includes a feedback facility 950. In the example shown, query field 909 indicates that the user has submitted the query, "Gary Danko San Francisco," and example interface 900 displays results generated by multiple search engines for the query in the carousel slots, with the results for the selected slot shown in area 905. In this example, it has been determined (e.g., by dialogue manager 707 in FIG. 7, server 805 in FIG. 8, etc.) that the user is attempting to make a restaurant reservation. Feedback facility 950 displays information that is identified as relating to performing the task of making a restaurant reservation, and as not having been supplied in the user's query. Thus, in the example shown, feedback facility 950 identifies information to be provided by the user, including the date a reservation is desired ("Date?"), a time ("Time?") and a party size ("People?"). A feedback facility such as the example feedback facility 950 shown in FIG. 9 need not be employed to prompt a user for information, as any suitable facility (e.g., a screen interface presented by a website for collecting input from a user, and/or another type of facility) may be employed. A feedback facility may prompt a user for any suitable information, or provide any other suitable type of feedback to a user. For example, in some embodiments of the invention, a feedback facility may be used to supply confirmation of a query submitted by the user. In some embodiments, presentation of a feedback facility may cause the portion of the display which is devoted to presenting other information (e.g., search results generated based on the user's query) to be reduced, such as by re-sizing the other information or otherwise reducing the amount of display "real estate" it occupies.

If feedback facility 950 is used to prompt the user for information, then the user may supply some or all of the information for which he/she is prompted, in any of numerous ways. For example, a user may provide input in relation to one of the search results shown in area 905. For example, the user could tap button 911 to indicate that voice input is forthcoming, and then speak input such as, "first one for tomorrow at eight for two," indicating that the first entry 960 shown in area 905 should be selected as identifying a restaurant satisfying the user's original query, and that a reservation is desired for tomorrow at eight p.m. for two people. Alternatively, a user may select one of the entries shown in area 905 by, for example, tapping or clicking on it, and may then tap button 911 to provide speech input that need not specify a selection already made (e.g., may say "tomorrow at seven for two" without specifying the "first one" in the example above). Alternatively, in either example, rather than speak further input, the user may type input in the area 909. In another example, feedback facility may be capable of receiving user touch input, and/or input provided in any other suitable way. For example, the user may tap or click on feedback facility 950 to indicate that he/she would like to supply requested information. For example, the user could tap the area of feedback facility 950 in which the word "Date?" appears, then speak, type, or otherwise provide input relating to this piece of information (e.g., by speaking "tomorrow"), and then repeat this process for one or more other pieces of information shown in feedback facility 950. Alternatively, the user could select the feedback facility and then provide (e.g., via speech, typed and/or other form of input) all of the input prompted for in a single data entry.

It should be appreciated that feedback facility 950 illustrates but one example manner of prompting the user for additional information. For example, rather than merely indicating information that is to be collected, as in FIG. 9, an input facility could display options for each item of information, and/or choices to the user. For example, for the "Time?" item of information, different time slots could be presented. These may, for example, list time slots within a predetermined period (e.g., between six p.m. and eleven p.m.), list all slots that are times at which a table on the specified date for the specified party size is available (identified, for example, as described below with reference to FIG. 10), or present information in any other suitable fashion.

Example process 100 then proceeds to act 150, wherein a determination is made as to whether information received from the user in act 140 relates to the current query or a new query. In this respect, the inventor has appreciated that users sometimes submit a query and then submit additional information to supplement it, but at other times submit one query to a search application, and then after results from that query are presented, submit an unrelated query. Thus, some embodiments of the invention provide the ability to distinguish between information that relates to an original query (e.g., the date, time and/or party size in the example above), and a query that is newly submitted by the user.

Determining whether user input relates to a previous query or constitutes a new query may be performed in any of numerous ways. For example, in some embodiments of the invention, ASR 305 (FIG. 3) or 407 (FIG. 4) may employ a natural language understanding (NLU) engine to classify information received in act 140 to determine its semantic content and whether the information is in furtherance of a previously received query, or constitutes a new query. Using the example given above with reference to FIG. 9 to illustrate, if in response to the request for a reservation date, time and party size being displayed in feedback facility 950, the user tapped on button 911 and spoke, "Red Sox score," then an NLU engine may determine that this input does not include any of the information requested (e.g., based upon a classification of the information), and that the user is not supplying information to further his/her previously submitted query, but is instead submitting a new, unrelated query. Alternatively, instead of employing an NLU engine, a set of rules may be developed defining information expected to be supplied by the user in response to a particular prompt, and determining whether the user's input provides any of that information. For example, if the user is prompted for a party size for a reservation, the expected response to the prompt may include a number. If the user's response to the prompt does not include a number, then a rule-based system may determine that the input is not in furtherance of the previous query, but rather constitutes a new query. Of course, the previous examples are intended to be illustrative, non-limiting examples, as any suitable technique(s) may be employed to distinguish between information that relates to a previous and that which relates to a new query.

In some embodiments of the invention, some or all of the information previously submitted in furtherance of a query may be preserved for subsequent use. For example, if in response to the request for a reservation date, time and party size being displayed in feedback facility 950, the user tapped on button 911 and spoke "tomorrow," but left out the time and party size, and then immediately thereafter spoke "Red Sox score," some embodiments of the invention may preserve the information indicating that a reservation is desired for tomorrow, so that if the user returns to the original task of making a reservation, this information need not be collected again.

Preservation of the information may be accomplished in any of numerous ways. For example, in some embodiments, dialogue manager 707 (FIG. 7) may store a record of the restaurant reservation task, and any information collected in furtherance of that task. The task may thereafter be resumed, for example, if the user submits input that is determined (e.g., by an NLU engine or otherwise) as relating to the stored task. For example, if after speaking "Red Sox score" (which may, for example, cause a display such as example interface 900 to exit the dialogue for collecting information relating to a restaurant reservation, and show completely different information), the user spoke "let's try tomorrow night for two people," then dialogue manager 707 may determine that the input relates to the stored task of making a restaurant reservation, retrieve information relating to that task, and employ the user's new input (e.g., "two people") in furtherance of performing the task.

IV. Employing Received Input to Further Performance of a Task

In example process 100, if it is determined in act 150 that the information received in act 140 relates to a new query, then example process 100 returns to act 120, wherein a determination is made whether the new query is fully specified, or whether it relates to a task for which more information is to be provided, and the example process 100 continues as described above. However, if it is determined in act 150 that the information supplied by the user in act 140 relates to a pending query (in some embodiments, either the last query received, or one previously received and stored, as described above), then the process proceeds to act 160, wherein the information received is employed in furtherance of the task specified by the pending query.

Employing the information received in act 140 to further completion of the task specified by the pending query may entail, for example, providing the information to one or more search engines. For example, in some embodiments, information received to further completion of a task specified by a pending query may be relevant to multiple search engines for which results have been returned (e.g., in multiple slots in the carousel shown in FIG. 9). If so, the information received may be provided to two or more search engines, so that search results provided by each of those search engines may be updated based on the information received. As a result, results from the multiple search engines may be kept "in sync" based on the latest input received from the user.

To illustrate, consider an example scenario in which example process 100 is performed to allow a user to shop for a DVD player. An initial query received from the user in act 110 which includes the words "prices for DVD players" may be submitted to multiple search engines (e.g., as described above with reference to FIG. 9), and results generated by each of those search engines may be displayed to the user. In one non-limiting example, search results may be displayed using an interface that employs a carousel metaphor, in which each slot in the carousel is occupied by a different search engine, and results from a particular search engine may be viewed by selecting a corresponding slot. For example, the query may be submitted to search engines provided by multiple retailer websites, and a user may view search results generated by a particular retailer's website search engine by selecting a corresponding slot in the carousel.

In act 120, it may be determined (e.g., by dialogue manager 707, shown in FIG. 7, as described above, and/or by one or more other components) that the user is attempting to perform the task of shopping for a DVD player. As a result, in act 130, the user may be prompted for information to advance the performance of that task. For example, the user may be prompted for information such as a brand name for a desired player, a type of player, a price range, and/or other information. To illustrate, assume in this example that the user supplies input identifying a price range that is received in act 140, and that it is determined in act 150 that the input received in act 140 relates to the current query (i.e., shopping for a DVD player) rather than a new query.

Figure 10:
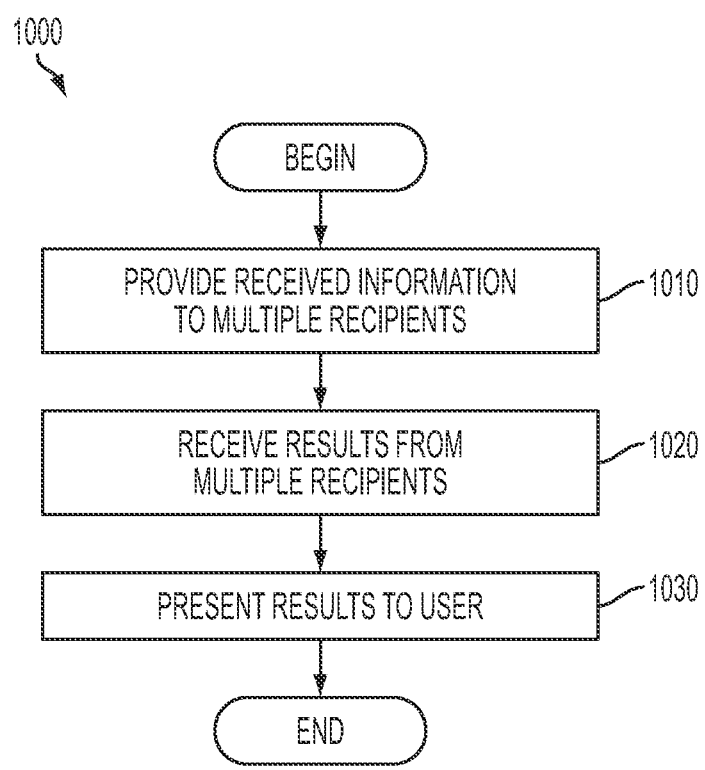
FIG. 10 is a flowchart depicting an example process for distributing information received from a user to multiple recipients, in accordance with some embodiments of the invention.

In this example, act 160 may involve providing the information received in act 140 to one or more of the search engines in addition to the one for which results are being shown to the user (e.g., the one in the center slot in the carousel shown in FIG. 9). When the results are submitted to two or more (e.g., all of the multiple search engines), each may generate updated results for display to the user. An example process 1000 for providing information to multiple recipients (e.g., search engines), and presenting updated results received from each recipient, is shown in FIG. 10. Example process 1000 begins with act 1010, wherein received information is provided to multiple recipients. Using the example given above to illustrate, input received from the user in act 140 may be provided to search engines for which results are displayed. This may be performed in any of numerous ways. In one example technique, server 705 (FIG. 7) may generate an updated version of a query previously submitted to the multiple search engines, and provide this updated version to application program 709 for transmission to the multiple search engines. In another example technique, server 705 may generate an updated version of the query and transmit the updated version to the multiple search engines directly. In yet another example, application program 709 may generate the updated version of the query and transmit the updated version to the multiple search engines.

A query may be updated in any suitable way, as embodiments of the invention are not limited in this respect. In one example technique, information newly received from a user may be combined with previously received information to create a new query for submission to one of more search engines. For example, if a user's original query was to search for the restaurant Mistral, and then he/she added information specifying a desired reservation time at 8:00 for a party of two people, then a new query could be created from the originally and newly received information specifying the restaurant Mistral, a party of two at 8:00. Alternatively, if one or more search engines to which a query were submitted were capable of maintaining a record (e.g., state) of a previously submitted query, then newly received information may be submitted (e.g., with an indication that the new information relates to the previously submitted query). Any suitable technique(s) may be employed.

Example process 1000 then proceeds to act 1020, wherein results generated based on information provided in act 1010 are received from the multiple recipients. For example, updated results generated by each of multiple search engines may be received.

Example process 1000 then proceeds to act 1030, wherein the results are presented to the user, and then terminates. For example, search results generated by each of the multiple search engines to which information is provided in act 1010 may be presented, updated based on the information. If search results are displayed using an interface that employs a carousel metaphor in which each slot in the carousel is occupied by one of the multiple search engines, then the results received in act 1020 from each search engine may be presented in a corresponding slot. Of course, embodiments of the invention are not limited to displaying results using an interface that employs a carousel metaphor, as any suitable technique for displaying results may be employed.

It should be appreciated that example process 1000 provides a capability whereby results from multiple search engines may be kept "in sync" as new information is received from a user, to allow the information to be disseminated to multiple search engines without the user having to interact with each search engine one by one. This may, for example, save effort and time for the user. Using the DVD player shopping example given above to illustrate, a user need not interact with each one of the multiple search engines from which results were received from an initial query to indicate a desired price range of a DVD player. Rather, the user may provide this information once, and have it be distributed automatically to each of multiple search engines, thereby conserving effort and time, and enabling the user to perform such actions as comparing the DVD player models offered by different retailers within a given price range in an efficient manner.

It should also be appreciated that although the DVD shopping example given above involved providing information received from the user in act 140 to the same set of search engines as those to which an initial query was submitted in act 1010, embodiments of the invention are not so limited. For example, act 1010 may alternatively involve providing information received in act 140 to one or more other search engines to which an initial query was not submitted. For example, act 140 may include a determination (e.g., based on an assessment of the content of the information received in act 140) that one or more search engines which did not receive the initial query should receive an updated version of the query. For example, if the information received from the user in act 140 comprised the brand name of a particular DVD player manufacturer, rather than a price range as in the example given above, then an updated version of the query may be submitted to a search engine provided by the manufacturer's website, which may enable the user to research the features and capabilities of DVD players made by that manufacturer. Results generated by the search engine provided by the manufacturer's website may be presented to the user in addition to, or instead of, any updated results generated by the search engines to which the original query was submitted. For example, if search results are displayed using an interface that employs a carousel metaphor in which each slot in the carousel is occupied by a different search engine, then a new slot could be added to present search results generated by the search engine provided by the manufacturer's website, or results generated by the search engine provided by the manufacturer's website may assume a slot previously occupied by another search engine. Results generated based on updated information may be presented in any of numerous ways, as embodiments of the invention are not limited in this respect.

It should further be appreciated that although some embodiments of the invention may provide for supplying information to each of multiple search engines to keep the search engines "in sync," embodiments of the invention are not limited to such an implementation. For example, some embodiments may provide for supplying information to only a subset (e.g., one) of the multiple search engines, so that only the subset generates updated results for display to the user.

Referring again to example process 100, it should further be appreciated that act 160 need not involve providing information received in act 140 to multiple recipients. Instead, the information may be provided to a single recipient, such as a single search engine. Using the restaurant reservation example given above to illustrate, the information received in act 140 may be provided to a single search engine provided by a restaurant reservation website, such as to secure a reservation on the user's behalf.

In some embodiments, individual items of information may be provided to one or more search engines upon receipt from the user in act 140. Thus, if the user supplies some information in act 140 but not all of the information requested, then whatever is supplied may be provided to one or more search engines. In other embodiments, items of information may only be supplied to one or more recipients after all of the information requested is provided by the user. Using the example described above with reference to example interface 900 shown in FIG. 9 to illustrate, in some embodiments, information may only be provided to the search engines identified in slots 920, 925, 930, 935 and 940 once the user has specified a date, time and number of people, so that if a user provides less than all of the requested information, he/she may be prompted again to provide the rest. Items of information may be provided to one or more recipients in any suitable fashion, as embodiments of the invention are not limited in this respect.

In some embodiments, providing the information to one or more recipients may cause a display that is presented to the user to change. Using example interface 900 shown in FIG. 9 to illustrate, a user supplying an item of requested information relating to a restaurant reservation may cause, as an example, results generated by search engines provided by one or more websites to be displayed in one or more corresponding slots in the carousel, instead of or in addition to the results displayed in slots when results of the initial query were first presented. For example, if after submitting an initial general search for restaurants in a particular geographic area, a user identifies a particular restaurant at which a reservation is desired, results generated by a restaurant review website may be presented so that the user can assess reviews of the restaurant, results generated by the identified restaurant's website may be presented so that the user can inspect the restaurant's menu or wine list, results generated by a map website may be presented so that the user can see where the restaurant is located, results generated by a taxicab company's website may be presented so that the user can reserve a taxicab to the restaurant, etc. The results from the restaurant review website, the restaurant's website, the map website and/or the taxicab's website may be displayed instead of, or in addition to, results displayed in response to the user's initial general search. Thus, the display that is presented to the user may change as the user proceeds toward completing a task. Information provided by a user may be used in any of numerous ways.

It is possible that input provided by the user may describe an option that is unavailable to him/her. For example, user input may indicate a desire to secure a restaurant reservation at a time when there are no tables available at the specified restaurant. Thus, some embodiments of the invention provide a capability to conduct a dialogue with the user and provide feedback, so that one or more constraints defined by information supplied by the user may be relaxed. For example, some embodiments of the invention may suggest that the user consider a different time (e.g., one at which tables are known to be available), restaurant (e.g., one which is nearby the originally requested restaurant, offers similar cuisine and/or has similar ratings on restaurant review websites) and/or date (e.g., one on which tables are available at the requested time). Suggestion of an alternative may be accompanied by information on the alternative. For example, if an alternative restaurant is suggested to the user, then reviews of the alternative restaurant, a map showing the alternative restaurant's location, and/or other information may be shown to the user. In this way, embodiments of the invention may present information to the user that is useful in making decisions regarding how constraints may be relaxed, while also keeping the cognitive load on him/her low by removing the need to provide extensive input (e.g., times, dates, restaurant names, etc.).

In some embodiments, an application program on the user's device (e.g., application program 403 in FIG. 4) with access to an application programming interface (API) provided by an application performing the task may interact with the API to determine alternatives to suggest to the user. For example, in the restaurant reservation example provided above, if the application on the client device has access to an API provided by a restaurant reservation website, it may issue queries to the website to identify restaurants, times, dates, and/or party sizes available, and then suggest alternatives that are determined to be available (e.g., "I see there are no tables available at eight p.m.; how about seven p.m. instead?"). In an alternate embodiment, an application on the user's device may suggest that the user relax one or more constraints defined by information previously provided (e.g., by suggesting that the user pick another day or time), and then re-submitting a query specifying all of the information provided to the restaurant reservation website.

Figure 11:
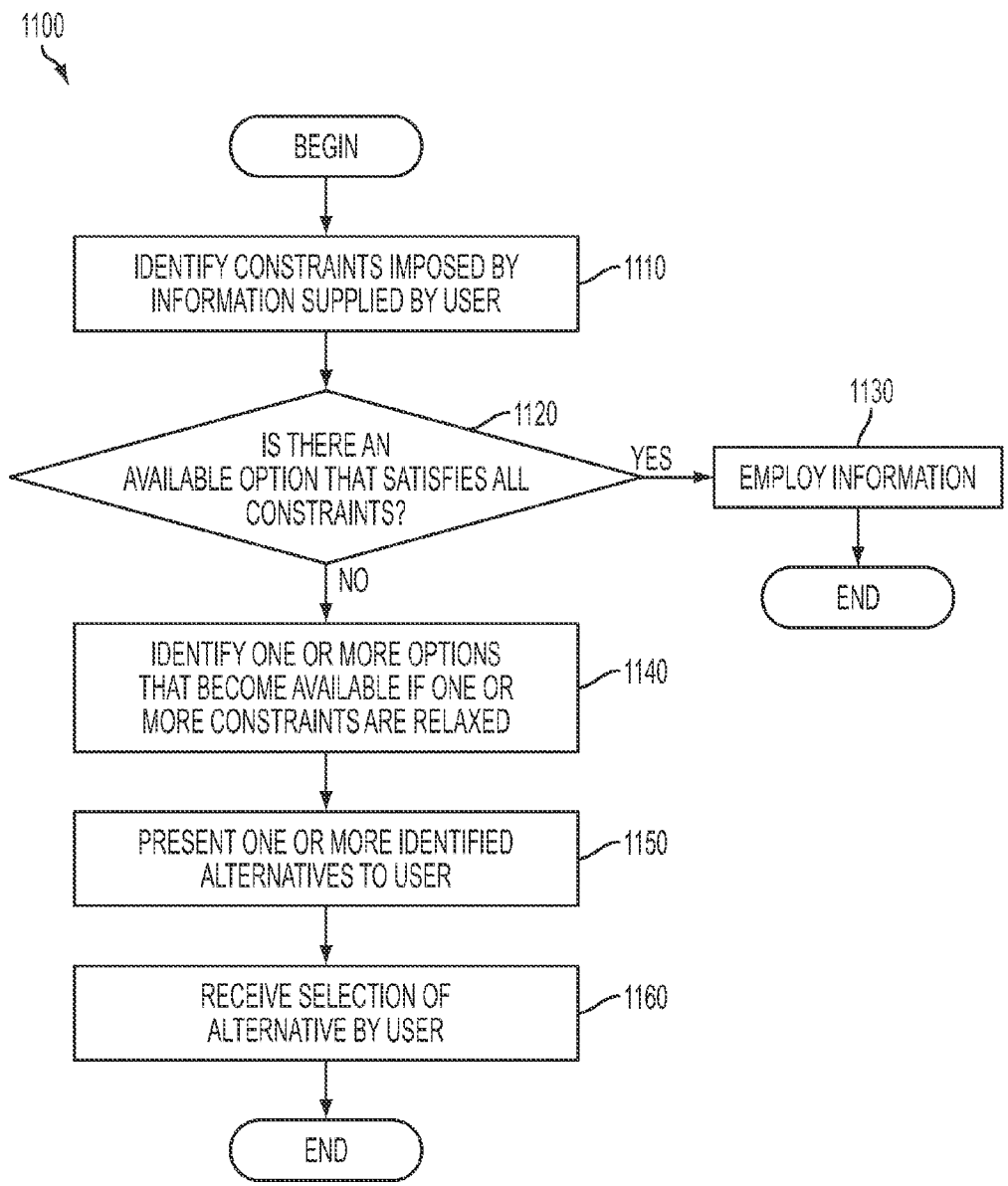
FIG. 11 is a flowchart depicting an example process through which a system conducts a dialogue with a user to present available options to the user, in accordance with some embodiments of the invention.

An example process 1100 for conducting a dialogue with a user to determine alternatives to that which a user initially requests is shown in FIG. 11. At the start of process 1100, one or more constraints imposed based on information supplied by the user are identified in act 1110. For example, if a user-specified query and/or information received in furtherance of a task specified a desire for a reservation at a specific restaurant, on a specific date, at a specific time for a specific number of people, then this information may be identified as constraints relating to securing the reservation.

Example process 1100 then proceeds to act 1120, wherein it is determined whether an available option satisfies all of the identified constraints. If so (e.g., if a table were available at the specified restaurant, for the specified number of people, at the specified date and time), then example process 1100 proceeds to act 1130, wherein information provided by the user is employed in furthering the task. For example, information supplied by the user relating to making a restaurant reservation may be supplied to a restaurant reservation website, as described above. Example process 1100 then completes.

If it is determined in act 1120 that there is no available option that satisfies all identified constraints, then example process 1100 proceeds to act 1140, wherein one or more options that would become available if one or more constraints were relaxed are identified. This may be performed in any of numerous ways. For example, a restaurant reservation website may be queried (e.g., using a publicly available interface and/or an API, as described above) using various alternatives to one or more identified constraints. In some embodiments, constraint relaxation with respect to certain types of user queries may be performed in a predefined manner, so as to increase the likelihood that a user finds proposed alternatives attractive. Using the example of a restaurant reservation to illustrate, in some embodiments, an attempt be made to relax a constraint such as a time specified by the user before attempting to relax a constraint such as the party size, since a user may find a proposed alternative which involves him/her going to the specified restaurant at a different time more attractive than going with a different number of people. Any suitable technique(s) may be employed to govern the manner in which constraints are relaxed. For example, rules may be defined for particular types of queries, for particular websites to which queries are submitted, and/or based on any other suitable criteria.

Example process 1100 then proceeds to act 1150, wherein one or more of the identified alternatives are presented to the user. This may be performed in any of numerous ways. In embodiments in which alternatives are presented on a small display (e.g., on a mobile device) which may limit the amount of information that can be shown to the user at any one time, alternatives may be displayed on a portion which scrolls in a ticker-like fashion, as described further below, so that more information is revealed to the user as the information is scrolled. However, all embodiments that relate to displaying alternatives are not limited in this respect, and may display alternatives in any suitable way.

At the completion of act 1150, example process 1100 proceeds to act 1160, wherein the selection of an alternative by user is received. A user may select an alternative in any of numerous ways, such as by tapping or clicking on information defining an alternative, identifying an alternative via voice input, by typing input, and/or via any other suitable form of input.

In some embodiments, selection of an alternative may cause other information on the display to change. Using the example of the restaurant reservation to illustrate, if the user opts to relax the "restaurant" constraint by selecting a different one than was specified in the original query, then information on the newly selected restaurant may be displayed. For example, a map showing the newly selected restaurant's location, reviews of the newly selected restaurant, etc. may be displayed. As such, the user may make an informed decision with respect to relaxing a constraint. Example process 1100 then completes.

Referring again to example process 100 (FIG. 1), upon the completion of act 160, a determination is made in act 170 whether more information is needed from the user to complete the identified task. For example, act 170 may involve determining whether all of the information for which the user was prompted in act 130 has been received. If it is determined in act 170 that more information is desired, then example process 100 returns to act 130, wherein the user is prompted for additional information. If, however, it is determined in act 170 that more information is not needed, then example process 100 completes.

As noted above, some embodiments of the invention evidence an appreciation for the value of "real estate" on a small display, and strive to maximize the amount of information to be provided as feedback to the user without disturbing the display of other information. For example, some embodiments may enable a user to control the manner in which feedback is displayed to him/her. Although described above in the context of displaying alternatives to a user, embodiments of the invention may be employed to enable a user to control the display of any suitable type of feedback.

Feedback facility 950, shown in FIG. 9, may be used to illustrate some example ways in which a user may control the display of feedback. In the example of FIG. 9, feedback facility 950 is a banner extending across the width of display 900. As noted above, the information presented on feedback facility 950 may change from one moment to the next (e.g., it may be scrolled in a ticker-like fashion, or otherwise change over time), so that the amount of information that can be presented to the user may exceed that which can be presented at any one time. Some embodiments of the invention enable a user to provide input to control the manner in which feedback is displayed.

Figure 12:
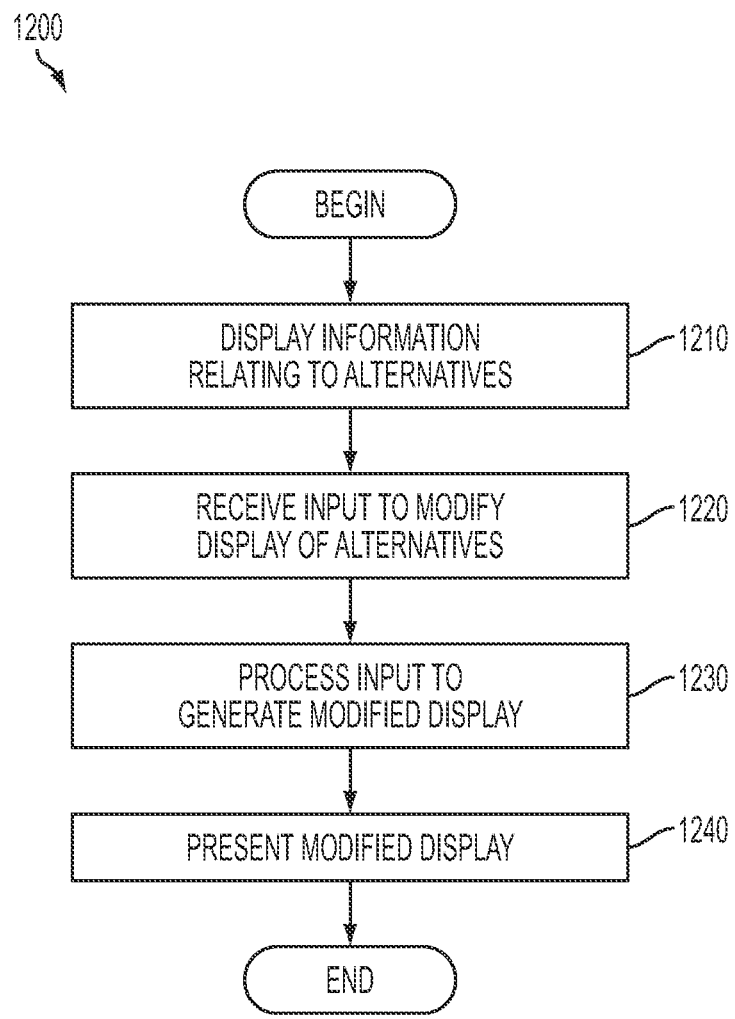
FIG. 12 is a flow chart depicting an example process for modifying a display based at least in part on input received from a user.

An example process 1200 for modifying the display of feedback based on user input is shown in FIG. 12. At the start of example process 1200, feedback is displayed to the user in act 1210. Feedback may be displayed using the banner shown in FIG. 9, or any other suitable facility (e.g., a bubble, or some other shape). The facility may extend in any suitable direction (e.g., horizontally, as shown in FIG. 9, vertically, or in some other direction), and be any suitable size. If information is scrolled within the facility, it may scroll horizontally, vertically, or in any other suitable fashion.

In act 1220, user input is received to modify the display of feedback. Any suitable form of input may be received. For example, a user may tilt the device in a particular direction, press a button or knob, provide speech input, and/or provide any other suitable form of input. For information which is scrolled, the user's input may, for example, cause scrolling speed to change (e.g., to speed up or slow down), cause the size of "scroll" space to change (e.g., be increased), and/or to change the display of scrolled information in any other suitable way(s).

In act 1230, the user's input is processed to modify the display of feedback. For example, programmed instructions defining how the input received in act 1220 influences the display of feedback may be executed. In act 1240, the modified display is presented to the user. For example, output generated by programmed instructions defining how information is displayed may be shown. Example process 1200 then completes.

It should be appreciated that the example processes described above with reference to FIGS. 1, 8, 10, 11, 12 and 14 are merely illustrative, and that numerous variations on each example process are possible. For example, variations on example processes 100, 800, 1000, 1100, 1200 and/or 1400 may include acts not described above, may omit any one or more of the acts described above, and/or include acts being performed in a different sequence than that which is described above. Embodiments of the invention are not limited to being implemented in any particular manner.

V. Implementation Detail

Figure 13:
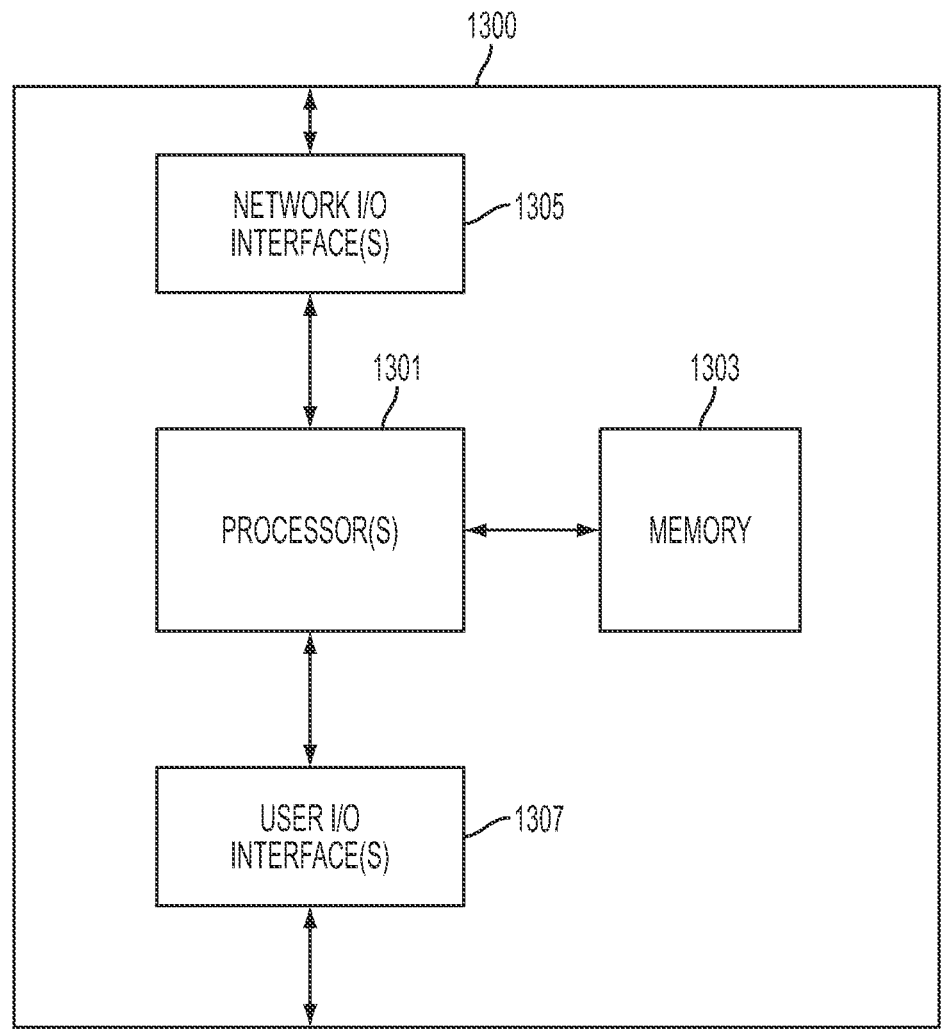
FIG. 13 is a block diagram depicting an example computing device on which some embodiments of the invention may be implemented.

Any of the above-discussed computing devices (e.g., client devices, servers, external computers, and/or any other above-discussed computing device) may be implemented in any of a variety of ways. FIG. 13 is a block diagram an illustrative computing device 1300 that may be used to implement any of the above-discussed computing devices.

The computing device 1300 may include one or more processors 1301 and one or more tangible, non-transitory computer-readable storage media (e.g., memory 1303). Memory 1303 may store, in tangible non-transitory computer-readable storage media computer instructions that implement any of the above-described functionality. Processor(s) 1301 may be coupled to memory 1303 and may execute such computer instructions to cause the functionality to be realized and performed. Computing device 1300 may also include a network input/output (I/O) interface 1305 via which the computing device may communicate with other computers (e.g., over a network), and may also include one or more user I/O interfaces, via which the computer may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of various embodiments of the present invention comprises at least one tangible, non-transitory computer-readable storage medium (e.g., a computer memory, a floppy disk, a compact disk, and optical disk, a magnetic tape, a flash memory, circuit configurations in Field Programmable Gate Arrays or other semiconductor devices, etc.) encoded with one or more computer programs (i.e., a plurality of instructions) that, when executed on one or more computers or other processors, performs the above-discussed functions of various embodiments of the present invention. The computer-readable storage medium can be transportable such that the program(s) stored thereon can be loaded onto any computer resource to implement various aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method, performed by at least one computer, comprising acts of:
   (A) receiving a query submitted by a user of a mobile device;
   (B) causing a representation of the query to be submitted to a plurality of search engines identified in response to receiving the query, the plurality of search engines comprising a first search engine associated with a first web site and a second search engine associated with a second web site, wherein the first web site operates using at least one computing device distinct from the at least one computer used to perform the method;
   (C) receiving, subsequent to receiving the query, free-form input submitted by the user to the first web site, and determining, using natural language understanding, whether the free-form input comprises supplemental information that relates to the query or whether the free-form input constitutes a new query, wherein determining whether the free-form input comprises supplemental information that relates to the query comprises using the natural language understanding to determine a semantic content of the free-form input; and
   (D) causing a representation of the free-form input received in the act (C) to be submitted to the second search engine, when it is determined that the free-form input comprises supplemental information that relates to the query submitted by the user of the mobile device.

2. The method of claim 1, wherein the act (C) comprises receiving the free-form input in response to prompting the user.

3. The method of claim 1, wherein the act (D) comprises causing the representation of the free-form input to be submitted to at least one search engine not included in the plurality of search engines.

4. The method of claim 1, wherein the act (D) comprises modifying the representation caused to be submitted in the act (B) to incorporate at least a portion of the free-form input received in the act (D), and causing the modified representation to be submitted to the at least one search engine.

5. The method of claim 1, wherein the plurality of search engines to which the representation of the query is caused to be submitted in the act (B) comprises at least one search engine provided by a retailer website.

6. The method of claim 1, wherein the query received in the act (A) comprises a voice query.

7. The method of claim 1, wherein the free-form input received in the act (C) comprises a voice input.

8. A method, performed by a client device, comprising acts of:
   (A) receiving a query from a user;
   (B) causing to be displayed, results generated based on the query from a plurality of search engines identified in response to receiving the query, the plurality of search engines comprising a first search engine associated with a first web site and a second search engine associated with a second web site, wherein the first search engine indexes content using a first index;
   (C) receiving, subsequent to receiving the query, free-form input from the user submitted to the first web site associated with the first search engine, and determining, using natural language understanding, whether the free-form input comprises supplemental information that relates to the query or whether the free-form input constitutes a new query, wherein determining whether the free-form input comprises supplemental information that relates to the query comprises using the natural language understanding to determine a semantic content of the freeform input; and (D) causing to be displayed, results generated based on the free-form input, from the second search engine, when it is determined that the free-form input comprises supplemental information that relates to the query.

9. The method of claim 8, wherein the act (C) comprises receiving the free-form input in response to prompting the user.

10. The method of claim 8, wherein the act (D) comprises causing to be displayed results generated by at least one search engine not included in the plurality of search engines.

11. The method of claim 8, wherein the plurality of search engines comprises at least one search engine provided by a retailer website.

12. The method of claim 8, wherein the query received in the act (A) comprises a voice query.

13. The method of claim 8, wherein the free-form input received in the act (C) comprises a voice input.

14. At least one tangible non-transitory computer readable medium having instructions encoded thereon which, when executed by at least one computer, perform a method comprising acts of:

(A) receiving a query submitted by a user of a mobile device;

(B) causing a representation of the query to be submitted to a plurality of search engines identified in response to receiving the query, the plurality of search engines comprising a first search engine associated with a first web site and a second search engine associated with a second web site, wherein the first web site operates using at least one computing device distinct from the at least one computer used to perform the method;

(C) receiving, subsequent to receiving the query, free-form input submitted by the user to the first web site, and determining, using natural language understanding, whether the free-form input comprises supplemental information that relates to the query or whether the free-form input constitutes a new query, wherein determining whether the free-form input comprises supplemental information that relates to the query comprises using the natural language understanding to determine a semantic content of the free-form input; and (D) causing a representation of the free-form input received in the act (C) to be submitted to the second search engine, when it is determined that the free-form input comprises supplemental information that relates to the query submitted by the user of the mobile device.

15. The at least one tangible non-transitory computer readable medium of claim 14, wherein the act (C) comprises receiving the free-form input in response to prompting the user.

16. The at least one tangible non-transitory computer readable medium of claim 14, wherein the act (D) comprises causing the representation of the free-form input to be submitted to at least one search engine not included in the plurality of search engines.

17. The at least one tangible non-transitory computer readable medium of claim 14, wherein the act (D) comprises modifying the representation caused to be submitted in the act (B) to incorporate at least a portion of the free-form input received in the act (C), and causing the modified representation to be submitted to the at least one search engine.

18. The at least one tangible non-transitory computer readable medium of claim 14, wherein the plurality of search engines to which the representation of the query is caused to be submitted in the act (B) comprises at least one search engine provided by a retailer website.

19. The at least one tangible non-transitory computer readable medium of claim 14, wherein the query received in the act (A) comprises a voice query.

20. The at least one tangible non-transitory computer readable medium of claim 14, wherein the free-form input received in the act (C) comprises a voice input.

21. At least one tangible non-transitory computer readable medium having instructions encoded thereon which, when executed by a client device, perform a method comprising acts of:

(A) receiving a query from a user;

(B) causing to be displayed results, generated based on the query from a plurality of search engines identified in response to receiving the query, the plurality of search engines comprising a first search engine associated with a first web site and a second search engine associated with a second web site, wherein the first search engine indexes content using a first index;

(C) receiving, subsequent to receiving the query, free-form input from the user submitted to the first web site associated with the first search engine, and determining, using natural language understanding, whether the free-form input comprises supplemental information that relates to the query or whether the free-form input constitutes a new query, wherein determining whether the free-form input comprises supplemental information that relates to the query comprises using the natural language understanding to determine a semantic content of the freeform input; and (D) causing to be displayed results, generated based on the free-form input, from the second search engine, when it is determined that the free-form input comprises supplemental information that relates to the query.

22. The at least one tangible non-transitory computer readable medium of claim 21, wherein the act (C) comprises receiving the free-form input in response to prompting the user.

23. The at least one tangible non-transitory computer readable medium of claim 21, wherein the act (D) comprises causing to be displayed results generated by at least one search engine not included in the plurality of search engines.

24. The at least one tangible non-transitory computer readable medium of claim 21, wherein the plurality of search engines comprises at least one search engine provided by a retailer website.

25. The at least one tangible non-transitory computer readable medium of claim 21, wherein the query received in the act (A) comprises a voice query.

26. The at least one tangible non-transitory computer readable medium of claim 21, wherein the free-form input received in the act (C) comprises a voice input.

27. At least one computer, comprising:
at least one processor programmed to:
receive a query submitted by a user of a mobile device;
cause a representation of the query to be submitted to a plurality of search engines identified in response to receiving the query, the plurality of search engines comprising a first search engine associated with a first web site and a second search engine associated with a second web site, wherein the first web site operates using at least one computing device distinct from the at least one computer;
receive, subsequent to receiving the query, free-form input submitted by the user to the first web site, and determine, using natural language understanding, whether the free-form input comprises supplemental information that relates to the query or whether the free-form input constitutes a new query, wherein determining whether the free-form input comprises supplemental information that relates to the query comprises using the natural language understanding to determine a semantic content of the free-form input; and
cause a representation of the free-form input to be submitted to the second search engine, when it is determined that the free-form input comprises supplemental information that relates to the query submitted by the user of the mobile device.

28. The at least one computer of claim 27, wherein the at least one processor is programmed to receive the free-form input in response to prompting the user.

29. The at least one computer of claim 27, wherein the at least one processor is programmed to cause the representation of the free-form input to be submitted to at least one search engine not included in the plurality of search engines.

30. The at least one computer of claim 27, wherein the at least one processor is programmed to modify the representation of the query to incorporate at least a portion of the received free-form input, and to cause the modified representation to be submitted to the at least one search engine.

31. The at least one computer of claim 27, wherein the plurality of search engines to which the representation of the query is caused to be submitted comprises at least one search engine provided by a retailer website.

32. The at least one computer of claim 27, wherein the received query comprises a voice query.

33. The at least one computer of claim 27, wherein the received freeform input comprises a voice input.

34. At least one computer, comprising:
at least one processor programmed to:
receive a query from a user;
cause to be displayed results, generated based on the query from a plurality of search engines identified in response to receiving the query, the plurality of search engines comprising a first search engine associated with a first web site and a second search engine associated with a second web site, wherein the first search engine indexes content using a first index;
receive, subsequent to receiving the query, free-form input from the user submitted to the first web site associated with the first search engine, and determine, using natural language understanding, whether the free-form input comprises supplemental information that relates to the query or whether the free-form input constitutes a new query; and
cause to be displayed results, generated based on the free-form input, from the second search engine, when it is determined that the free-form input comprises supplemental information that relates to the query.

35. The at least one computer of claim 34, wherein the at least one processor is programmed to receive the free-form input in response to prompting the user.

36. The at least one computer of claim 34, wherein the at least one processor is programmed to cause to be displayed results generated by at least one search engine not included in the plurality of search engines.

37. The at least one computer of claim 34, wherein the plurality of search engines comprises at least one search engine provided by a retailer website.

38. The at least one computer of claim 34, wherein the received query comprises a voice query.

39. The at least one computer of claim 34, wherein the received freeform input comprises a voice input.

* * * * *